(12) United States Patent
Tanaka

(10) Patent No.: US 12,107,299 B2
(45) Date of Patent: Oct. 1, 2024

(54) BATTERY APPARATUS

(71) Applicant: MAKITA CORPORATION, Anjo (JP)

(72) Inventor: Kazuya Tanaka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 229 days.

(21) Appl. No.: 17/657,782

(22) Filed: Apr. 4, 2022

(65) Prior Publication Data
US 2022/0344785 A1 Oct. 27, 2022

(30) Foreign Application Priority Data

Apr. 26, 2021 (JP) ................................ 2021-074326

(51) Int. Cl.
| | |
|---|---|
| *H01M 50/533* | (2021.01) |
| *H01M 10/42* | (2006.01) |
| *H01M 50/204* | (2021.01) |
| *H01M 50/247* | (2021.01) |

(52) U.S. Cl.
CPC ....... *H01M 50/533* (2021.01); *H01M 10/425* (2013.01); *H01M 50/204* (2021.01); *H01M 50/247* (2021.01); *H01M 2220/30* (2013.01)

(58) Field of Classification Search
CPC ............. H01M 50/533; H01M 50/503; H01M 10/052; H01M 10/425; H01M 10/443; H01M 50/204; H01M 50/247; H01M 2220/30
See application file for complete search history.

(56) References Cited

U.S. PATENT DOCUMENTS

2018/0190960 A1* 7/2018 Harris et al. ............ H01M 2/20

FOREIGN PATENT DOCUMENTS

JP 2017092049 A 5/2017

* cited by examiner

*Primary Examiner* — Haroon S. Sheikh
*Assistant Examiner* — Kan Luo
(74) *Attorney, Agent, or Firm* — J-TEK LAW PLLC; Jeffrey D. Tekanic; Scott T. Wakeman

(57) ABSTRACT

A battery apparatus may include: a plurality of battery cells, each of the battery cells having a positive electrode and a negative electrode; and a plurality of battery tabs. Each of the battery tabs has at least one cell-connection part, which is electrically connected to the positive electrode or the negative electrode of a respective one of the plurality of battery cells, and a sheet part, which is integrally formed with the at least one cell-connection part. Each of the battery tabs may be either a first-type battery tab or a second-type battery tab. The sheet thickness of at least one portion of the first-type battery tab may be larger than the sheet thickness of at least one portion of the second-type battery tab.

19 Claims, 12 Drawing Sheets

BATTERY APPARATUS

CROSS-REFERENCE TO RELATED APPLICATION

This application claims priority to Japanese patent application no. 2021-074326 filed on Apr. 26, 2021, the contents of which are fully incorporated herein by reference.

TECHNICAL FIELD

The present invention generally relates to a battery apparatus, such as a battery pack, battery cartridge or portable backpack power supply, that may be used to supply current to a power tool, outdoor power equipment, etc.

BACKGROUND ART

For example, the battery apparatus disclosed in Japanese Laid-open Patent Publication 2017-92049 comprises: a plurality of battery cells, each of the battery cells having a positive electrode and a negative electrode; and a plurality of battery tabs, each of the battery tabs having at least one cell-connection part, which is electrically connected to the positive electrode or the negative electrode of a respective one of the battery cells, and a sheet part, which is integrally formed with the at least one cell-connection part.

SUMMARY

It is one non-limiting object of the present teachings to disclose techniques for reducing the likelihood that one or more battery tabs might reach excessively high temperatures during a charging or discharging operation of the battery apparatus.

In a first aspect of the present teachings, a battery apparatus, such as a battery pack, a battery cartridge, a portable backpack power supply, etc., may comprise: a plurality of battery cells, each of the battery cells having a positive electrode and a negative electrode; and a plurality of battery tabs. Each of the battery tabs may have at least one cell-connection part (or battery cell connection part), which is electrically connected to the positive electrode or the negative electrode of a respective one of the battery cells, and a sheet part, which is integrally formed with the at least one cell-connection part. Each of the battery tabs may be either a first (first-type) battery tab or a second (second-type) battery tab. The sheet thickness of at least one portion of the first (first-type) battery tab may be larger (thicker) than the sheet thickness of at least one portion of the second (second-type) battery tab.

When electric current flows through a battery tab, heat may be generated owing to the electrical resistance of the battery tab, and this heat may cause the temperature of the battery tab to increase. If the sheet thickness of the battery tab(s) is small (relatively small or relatively thin), then electrical resistance is high (relatively high) and the amount of heat generated at such a location will be relatively large when a large current flows through the battery tab, thereby causing the temperature to rise, possibly excessively, at such a location when a large current flows through the battery tab. Conversely, if the sheet thickness of the battery tab(s) is large (relatively large or relatively thick), then electrical resistance is lower and thus less heat will be generated when a large current flows through the thicker battery tab, such that the temperature at a such a location tends not to rise, or significantly rise, even if a large current flows through the thicker battery tab. In the above-described configuration, because the first (first-type) battery tabs having the larger sheet thickness are utilized at locations where a large current is expected to flow through the battery tab, less heat is generated at such locations due to the lower electrical resistance and thereby the likelihood of an excessive temperature increase in such first (first-type) battery tabs can be reduced. Consequently, it is possible to reduce the likelihood that one or more of the battery tabs (in particular, the battery tabs that conduct relatively large amounts of current) will reach excessively high temperatures, e.g., during a charging or discharging operation of the battery apparatus.

DETAILED DESCRIPTION

Figure 1:
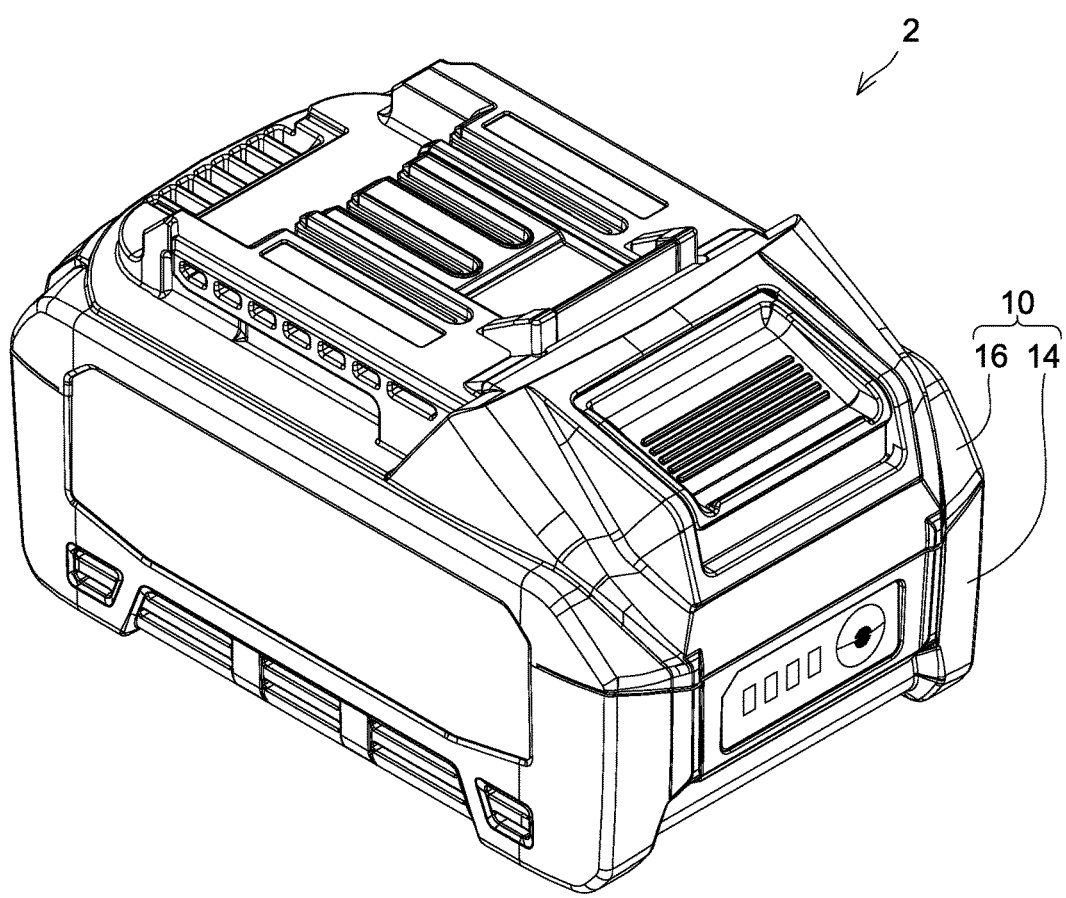
FIG. 1 is an oblique view, viewed from the front, the right, and above, of a battery pack 2 according to Working Example 1.
Figure 1:
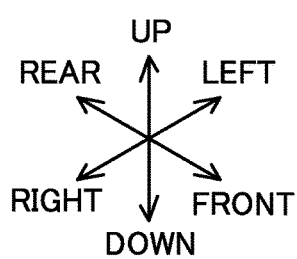

Representative and nonlimiting concrete (specific) examples of the present teachings are explained in detail below, with reference to the drawings. This detailed description is merely intended to describe to a person skilled in the art details for implementing preferred embodiments of the present teachings and is not intended to limit the scope of the present invention. In addition, the additional features and embodiments disclosed below can be used separately and/or together with other features and inventions in order to provide a further improved embodiments of a battery apparatus, methods of manufacturing the same, and methods of using the same.

In addition, combinations of the features and processes disclosed in the detailed description below are, in the broadest meaning, not essential for implementing the present invention and are recited merely to particularly explain representative concrete examples of the present teachings. Furthermore, in the provision of additional and useful embodiments of the present teachings, the various features of the representative concrete examples above and below and the various features recited in the independent and dependent claims do not have to be combined as in the concrete examples disclosed herein or in the order enumerated herein.

All features recited in the present specification and/or the claims are intended, separately from the configuration of features recited in the working examples and/or the claims, to be disclosed individually and mutually independently as limitations relative to the disclosure and the specific matters claimed in the original patent application. Furthermore, description related to numerical ranges, groups, and collections are intended to disclose intermediate configurations or ranges thereof as limitations relative to the disclosure and the specific matters and the original claims of the patent application.

In one or more embodiments, a battery apparatus may comprise: a plurality of battery cells, each of the battery cells having a positive electrode and a negative electrode; and a plurality of battery tabs, each of the battery tabs having at least one cell-connection part, which is electrically connected to the positive electrode or the negative electrode of any battery cell among the plurality of battery cells, and a sheet part, which is integrally formed with the at least one cell-connection part. Each battery tab among the plurality of battery tabs may be either a first-type battery tab or a second-type battery tab. The sheet thickness of at least one portion of the first-type battery tab may be larger than the sheet thickness of at least one portion of the second-type battery tab.

The locations of each battery tab of the plurality of battery tabs undergo temperature increases owing to the generation of heat when electric current flows therethrough. If the sheet thickness at the location(s) where the electric current is flowing is small, electrical resistance is high; therefore, the amount of heat generated is large and thereby the temperature tends to rise. Conversely, if the sheet thickness at the location(s) where the electric current is flowing is large, electrical resistance is low; therefore, the amount of heat generated is small (smaller) and thereby the temperature tends not to rise. According to the above-mentioned configuration, because the battery tab(s) that is (are) at the location(s) where the temperature tends to become high are made (configured) as first-type battery tabs, the sheet thickness at the location(s) where the temperature tends to become high is made larger; therefore, the amount of heat generated at the location(s) where the temperature would otherwise tend to become high is reduced and thereby a rise in the temperature of such battery tab(s) can be curtailed. Consequently, it is possible to reduce the likelihood that one or more of the battery tabs might reach excessively high temperatures during charging or discharging operations.

In one or more embodiments, the electric current that flows through the at least one portion of the first-type battery tab may be larger than the electric current that flows through the at least one portion of the second-type battery tab.

Among the plurality of battery tabs, because a relatively large amount of heat is generated at the location(s) where a large current flows through the battery tab(s), the temperature of such battery tab(s) may tend to rise when a large current flows through such battery tab(s); on the other hand, because a relatively small amount of heat is generated at the location(s) where the current that flows is not so large (i.e. the current is lower or relatively low), the temperature of such battery tab(s) tends not to rise. In the above-described configuration, by making the sheet thickness of the battery tab(s) larger at the location(s) where a large current will flow, e.g., during a charging or discharging operation of the battery apparatus, less heat will be generated and thereby a rise in temperature of such battery tab(s) can be curtailed. Consequently, the likelihood that one or more of the battery tabs might reach excessively high temperatures during charging or discharging operations is reduced.

In one or more embodiments, the battery apparatus may further comprise a circuit board. Each of the battery tabs may further comprise a circuit-connection part, which is electrically connected to the circuit board, and a lead part, which is integrally formed with the circuit-connection part and with the sheet part. The at least one portion (i.e. a thicker portion) of the first-type battery tab may include the lead part of the first-type battery tab. The at least one portion of the second-type battery tab may include the lead part of the second-type battery tab.

In the following description, the term "lead part" will be used in a manner that is synonymous with "electrically conductive part". In other words, the term "lead" is being used in the sense of an "electrical lead" and not in the sense of the element lead (Pb). Thus, lead parts according to the present teachings may be made of any conductive metal or alloy, such as copper, copper alloy, aluminum, aluminum alloy, etc.

When each circuit-connection part of the plurality of battery tabs is electrically connected to the circuit board, the current that flows to the lead parts of some of the battery tabs is large (relatively large) and the current that flows to the lead part(s) in one or more of the other battery tabs is not so large (e.g., is relatively small). According to the above-described configuration, by using the first-type battery tabs for the battery tabs through which a relatively large current flows to the lead parts, the sheet thickness of those lead parts can be made larger; therefore, the amount of heat generated in those lead parts can be reduced and thereby the rise in temperature of such first-type battery tabs can be curtailed. Consequently, it is possible to reduce the likelihood that one or more of the battery tabs might reach excessively high temperatures during charging or discharging operations.

In one or more embodiments, the at least one portion (i.e. the thicker portion) of the first-type battery tab may include the circuit-connection part of the first-type battery tab. The at least one portion of the second-type battery tab may include the circuit-connection part of the second-type battery tab.

When each circuit-connection part of the plurality of battery tabs is electrically connected to the circuit board, the current that flows to the circuit-connection parts of some of the battery tabs is large (relatively large) and the current that flows to the circuit-connection part(s) of one or more of the other battery tabs is not so large (e.g., is relatively small). According to the above-described configuration, by using the first-type battery tabs for the battery tabs through which a relatively large current flows to the circuit-connection parts, the sheet thickness of those circuit-connection parts can be made larger; therefore, the amount of heat generated in those circuit-connection parts can be reduced and thereby the rise in temperature of such first-type battery tabs can be curtailed. Consequently, it is possible to reduce the likelihood that one or more of the battery tabs might reach excessively high temperatures during charging or discharging operations.

In one or more embodiments, the width of the circuit-connection part of the first-type battery tab may be smaller (less) than the width of the lead part of the first-type battery tab.

With regard to each of the battery tabs, if the width of the circuit-connection part is smaller than the width of the lead part, the electrical resistance of the circuit-connection part is larger; therefore, the amount of heat generated is larger and thereby the temperature tends to rise. According to the above-described configuration, by using the first-type battery tabs for the battery tabs in which the electrical resistance of the circuit-connection parts would otherwise be larger, the sheet thickness of those circuit-connection parts can be made large; therefore, the amount of heat generated at (in) those circuit-connection parts can be reduced and thereby a rise in temperature of such first-type battery tabs can be curtailed. Consequently, it is possible to reduce the likelihood that one or more of the battery tabs might reach excessively high temperatures during charging or discharging operations.

In one or more embodiments, the width of the circuit-connection part of the first-type battery tab may be smaller (less) than the width of the sheet part of the first-type battery tab.

With regard to each of the battery tabs, if the width of the circuit-connection part is smaller than the width of the sheet part, the electrical resistance of the circuit-connection part is larger; therefore, the amount of heat generated is larger and thereby the temperature of the battery tabs tends to rise. According to the above-described configuration, by using the first-type battery tabs for the battery tabs in which the electrical resistance of the circuit-connection parts would otherwise be larger, the sheet thickness of those circuit-connection parts can be made larger; therefore, the amount of heat generated at the circuit-connection parts can be reduced and thereby a rise in temperature of such first-type battery tabs can be curtailed. Consequently, it becomes less likely that one or more of the battery tabs might reach excessively high temperatures, e.g., during charging or discharging operations.

In one or more embodiments, the circuit board may comprise: a positive-electrode, power-supply terminal and a negative-electrode, power-supply terminal, which are for charging the plurality of battery cells and for discharging the plurality of battery cells; and cell-voltage-detection terminals, which are for detecting cell voltages of the battery cells of the plurality of battery cells. Each of the circuit-connection parts of the first-type battery tabs may be electrically connected to the positive-electrode, power-supply terminal or the negative-electrode, power-supply terminal. The circuit-connection parts of the second-type battery tabs may be electrically connected to the cell-voltage-detection terminals.

In the above-described configuration, because the electric currents that flow to the lead parts, the circuit-connection parts, and the like of the first-type battery tabs are for charging the plurality of battery cells and for discharging the plurality of battery cells, those currents are larger. In contrast, because the currents that flow to the lead parts, the circuit-connection parts, and the like of the second-type battery tabs are for detecting the cell voltages of the plurality of battery cells, those currents are not so large, i.e. the currents are relatively small (low). According to the above-described configuration, the first-type battery tabs are used for the battery tabs through which relatively large currents flow to the lead parts, the circuit-connection parts, and the like and thereby the sheet thickness of those lead parts, circuit-connection parts, and the like is made larger; therefore, the amount of heat generated in those lead parts, circuit-connection parts, and the like can be reduced and thereby a rise in temperature of such first-type battery tabs can be curtailed. Consequently, it is possible to reduce the likelihood that one or more of the battery tabs might reach excessively high temperatures during charging or discharging operations.

In one or more embodiments, the plurality of battery cells may include first battery cells. The first-type battery tabs may be respectively electrically connected to one the positive electrode or the negative electrode of the first battery cells. The second-type battery tabs may be respectively electrically connected to the other of the positive electrode and the negative electrode of the first battery cells.

From among the battery tabs electrically connected to one of the battery cells (e.g., a first battery cell), the temperature of the battery tabs that are electrically connected to one of the positive electrode and the negative electrode tends to become high (owing to the relatively large currents that flow therethrough), and the temperature of the battery tabs electrically connected to the other of the positive electrode and the negative electrode tends not to become high (owing to the relatively small currents that flow therethrough). According to the above-described configuration, those battery tabs, among the battery tabs electrically connected to the first battery cell, whose temperature might otherwise tend to become high when a large current flows therethrough are configured as the first-type battery tabs and thereby their sheet thickness is made larger; therefore, the amount of heat generated in such battery tabs can be reduced, and a rise in temperature of such battery tabs can be curtailed. Consequently, it is possible to reduce the likelihood that one or more of the battery tabs might reach excessively high temperatures during charging or discharging operations.

In one or more embodiments, each of the battery cells may have a substantially circular-column shape extending in a longitudinal direction, the positive electrode thereof is disposed on (at) one end portion in the longitudinal direction, the negative electrode thereof is disposed on (at) the other end portion in the longitudinal direction, and the battery cells may be arranged side-by-side (in parallel) such that the longitudinal directions thereof are side-by-side (in parallel) in a first direction. On one side in the first direction, the first-type battery tabs may be electrically connected to the positive electrode or the negative electrode of the plurality of battery cells. On the other side in the first direction, the second-type battery tabs may be electrically connected to the positive electrode or the negative electrode of the plurality of battery cells.

According to the above-description configuration, the battery tabs on one side in the first direction can be manufactured with a common specification, and the battery tabs on the other side in the first direction can be manufactured with a common specification; therefore, the manufacture of the battery apparatus can be made even easier.

In one or more embodiments, the plurality of battery cells may comprise first battery cells, which are disposed in the vicinity of the center of the plurality of battery cells, and second battery cells, which are disposed on the outer sides of (around, surrounding) the first battery cells. The first-type battery tabs may be electrically connected to the positive electrode or the negative electrode of the first battery cells. The second-type battery tabs may be electrically connected to the positive electrode or the negative electrode of the second battery cells.

Generally speaking, the battery cells that are disposed in the vicinity of the center of all of the battery cells tend to build up heat (become hotter) owing to less direct ventilation (cooling) of such center battery cells, and consequently the temperature of the battery tabs electrically connected to those battery cells tends to become higher. In contrast, the battery cells that are disposed on the outer sides tend not to build up heat owing to better ventilation of the outer battery cells, and the temperature of the battery tabs electrically connected to those battery cells tends not to become high. According to the above-described configuration, the first-type battery tabs are used for battery cells (e.g., the center battery cells) in which the temperature might otherwise tends to become high and thereby their sheet thickness is made larger; therefore, the amount of heat generated can be reduced, and a rise in temperature of such battery tabs can be curtailed. Consequently, it is possible to reduce the likelihood that one or more of the battery tabs might reach excessively high temperatures, e.g., during charging or discharging operations.

In one or more embodiments, the first-type battery tabs may be composed of a single sheet material (metal sheet) and the second-type battery tabs may be composed of a single sheet material (metal sheet). The entire (overall) sheet thickness of the first-type battery tabs may be greater than the entire (overall) sheet thickness of the second-type battery tabs.

According to the above-described configuration, the sheet thickness of the first-type battery tabs can be made larger, and the benefits thereof can be achieved, without increasing the part count of the battery apparatus.

In the alternate, in one or more embodiments, each of the first-type battery tabs may be composed of a first sheet material (metal sheet) that is overlaid (superimposed) on a second sheet material (metal sheet).

According to the above-described configuration, the sheet thickness of the first-type battery tabs can be made larger using a simple configuration.

In one or more embodiments, the first sheet material may have at least one first cell-connection part corresponding to the at least one cell-connection part. The second sheet material does not have a portion corresponding to the at least one cell-connection part. For example, the second sheet material may have a through hole at the location corresponding to the cell-connection part of the first sheet material.

According to the above-described configuration, the assembly work of joining (electrically and physically connecting) the first cell-connection parts and the battery cells can be performed in the state in which the second sheet material is overlaid (superimposed) on the first sheet material.

In one or more embodiments, the battery apparatus may further comprise a circuit board. Each of the battery tabs may further comprise a circuit-connection part electrically connected to the circuit board. Each of the first-type battery tabs may comprise a first sheet material that is overlaid (superimposed) on a second sheet material. The first sheet material may comprise a first circuit-connection part corresponding to the circuit-connection part. The second sheet material may comprise a second circuit-connection part corresponding to the circuit-connection part. The first circuit-connection part and the second circuit-connection part may be joined to the circuit board by common solder.

According to the above-described configuration, the soldering of the first circuit-connection part to the circuit board and the soldering of the second circuit-connection part to the circuit board can be performed using a common process. Consequently, the manufacture of the battery apparatus can be made even simpler.

In one or more embodiments, the first circuit-connection part and the second circuit-connection part may be inserted through a common through hole, which is formed in the circuit board.

According to the above-described configuration, compared with an embodiment in which the through hole through which the first circuit-connection part is inserted and the through hole through which the second circuit-connection part is inserted are provided separately in the circuit board, a larger mount-surface area for the circuit board can be ensured.

In one or more embodiments, the battery apparatus may further comprise a circuit board. Each of the battery tabs further may comprise a circuit-connection part electrically connected to the circuit board. The first-type battery tabs may be composed of a first sheet material that is overlaid (superimposed) on a second sheet material. The first sheet material may comprise a first circuit-connection part corresponding to the circuit-connection part. The second sheet material does not have a portion corresponding to the circuit-connection part.

According to the above-described configuration, compared with an embodiment in which both the first sheet material and the second sheet material are joined to the circuit board, a larger mount-surface area for the circuit board can be ensured.

Working Example 1

A battery pack 2 according to the present Working Example 1, which is shown in FIG. 1, is used by being mounted on a battery-pack mount portion (not shown) of electrical equipment (not shown). The electrical equipment may be electrical equipment that runs on electric power supplied from the battery pack 2. The electrical equipment may be, for example, a power tool in which the electric motor of a driver, a drill, or the like serves as the power source, or may be an electric work machine in which the electric motor of a mowing machine (lawn mower), a blower, or the like serves as the power source. Alternatively, the electrical equipment may be electrical equipment that does not have a motor, such as a light, a radio, a speaker, or the like. Alternatively, the electrical equipment may be a charger that supplies electric power to the battery pack 2. The rated (nominal) voltage of the battery pack 2 is, for example, 36 V. The maximum voltage of the battery pack 2 is, for example, 40 V. The rated capacity of the battery pack 2 is, for example, 2.0 Ah. Hereinbelow, the direction in which the battery pack 2 is slid when being mounted on the battery-pack mount portion is called the rearward direction, and the direction in which the battery pack 2 is slid when being removed from the battery-pack mount portion is called the forward direction. In addition, in the state in which the battery pack 2 is mounted on the battery-pack mount portion, the direction in which the battery-pack mount portion is located, viewed from the battery pack 2, is called the upward direction, and the direction the reverse of the upward direction is called the downward direction. Furthermore, the direction orthogonal to the front-rear direction and the up-down direction is called the left-right direction.

The battery pack 2 comprises a casing (case, housing) 10 and a battery-cell unit 12 (refer to FIG. 2), which is housed in the interior of the casing 10. The casing 10 comprises a lower casing (shell) 14 and an upper casing (shell) 16. The lower casing 14 and the upper casing 16 are fixed to one another by fasteners, such as screws (not shown). Rails (not numbered) are defined on the upper casing 16 for slidably engaging with corresponding rails of an electrical equipment, such as a power tool in a detachable manner.

Figure 2:
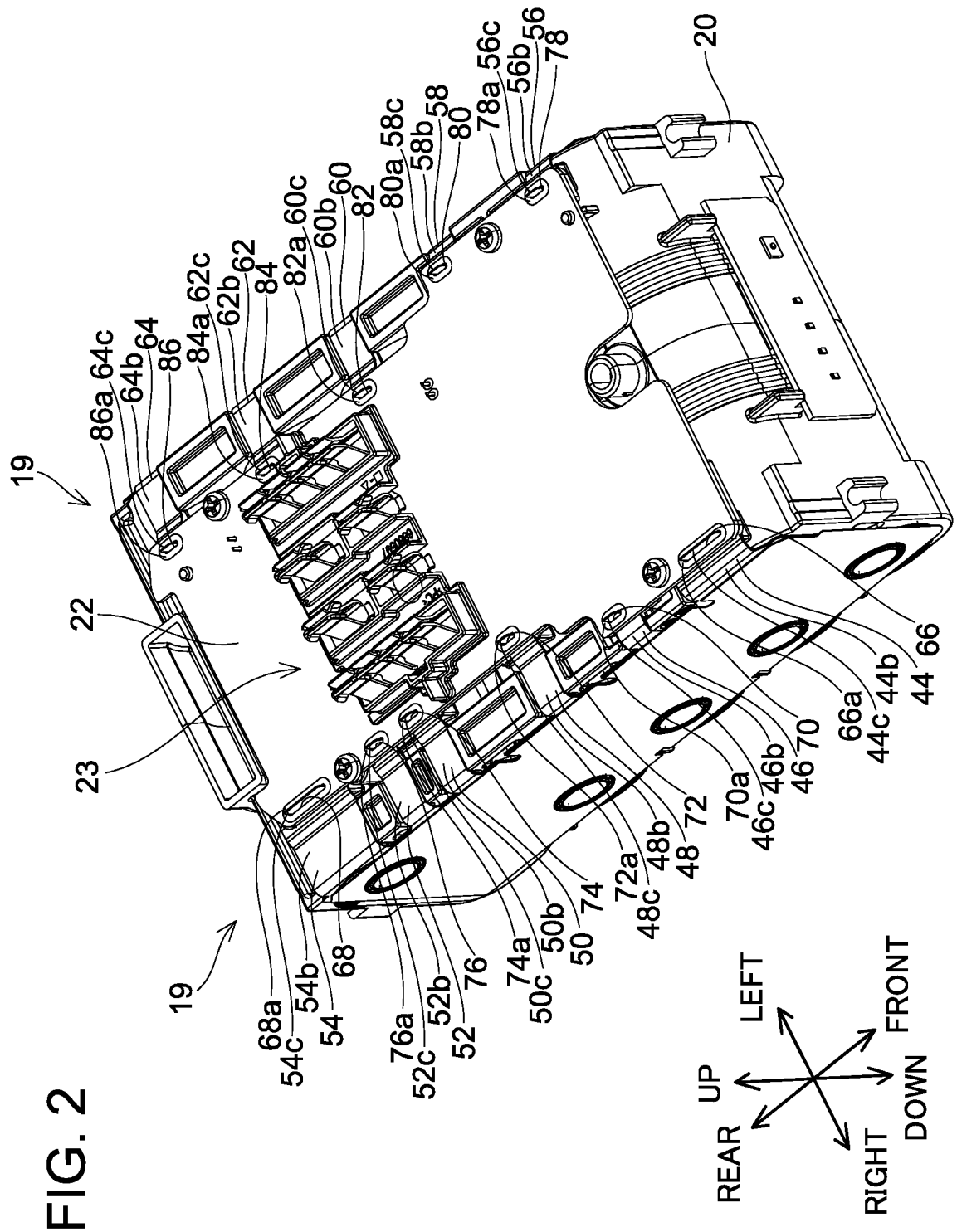
FIG. 2 is an oblique view, viewed from the front, the right, and above, of a battery-cell unit 12 of the battery pack 2 according to Working Example 1.

As shown in FIG. 2, the battery-cell unit 12 comprises: a plurality of battery cells 18 (refer to FIG. 3); a cell holder 20, which is made of a resin (polymer) and holds the plurality of battery cells 18; and a control circuit board 22, which is held by the cell holder 20 upward of the cell holder 20. Battery-side terminals 23 are provided on an upper surface of the control circuit board 22 and extend through the upper casing 16 so as to be exposed to outside of the battery pack 2. When the battery pack 2 is mounted on the battery-pack mount portion of the electrical equipment, the battery-side terminals 23 mechanically engage and electrically connect with corresponding equipment-side terminals (not shown) of the electrical equipment.

Figure 3:
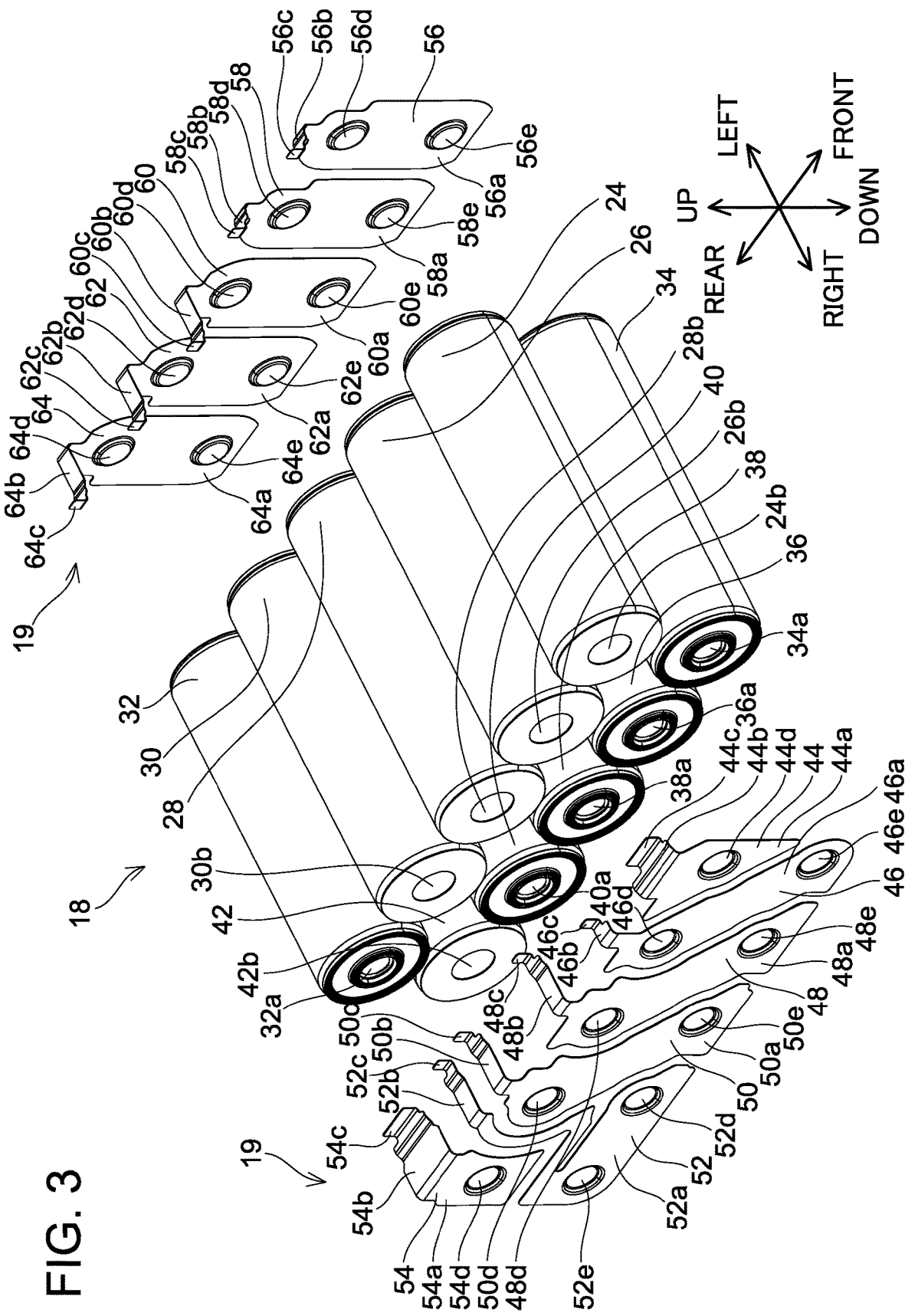
FIG. 3 is an oblique view, viewed from the front, the right, and above, that shows the correspondence relationship between a plurality of battery cells 18 and a plurality of battery tabs 19 of the battery pack 2 according to Working Example 1.
Figure 4:
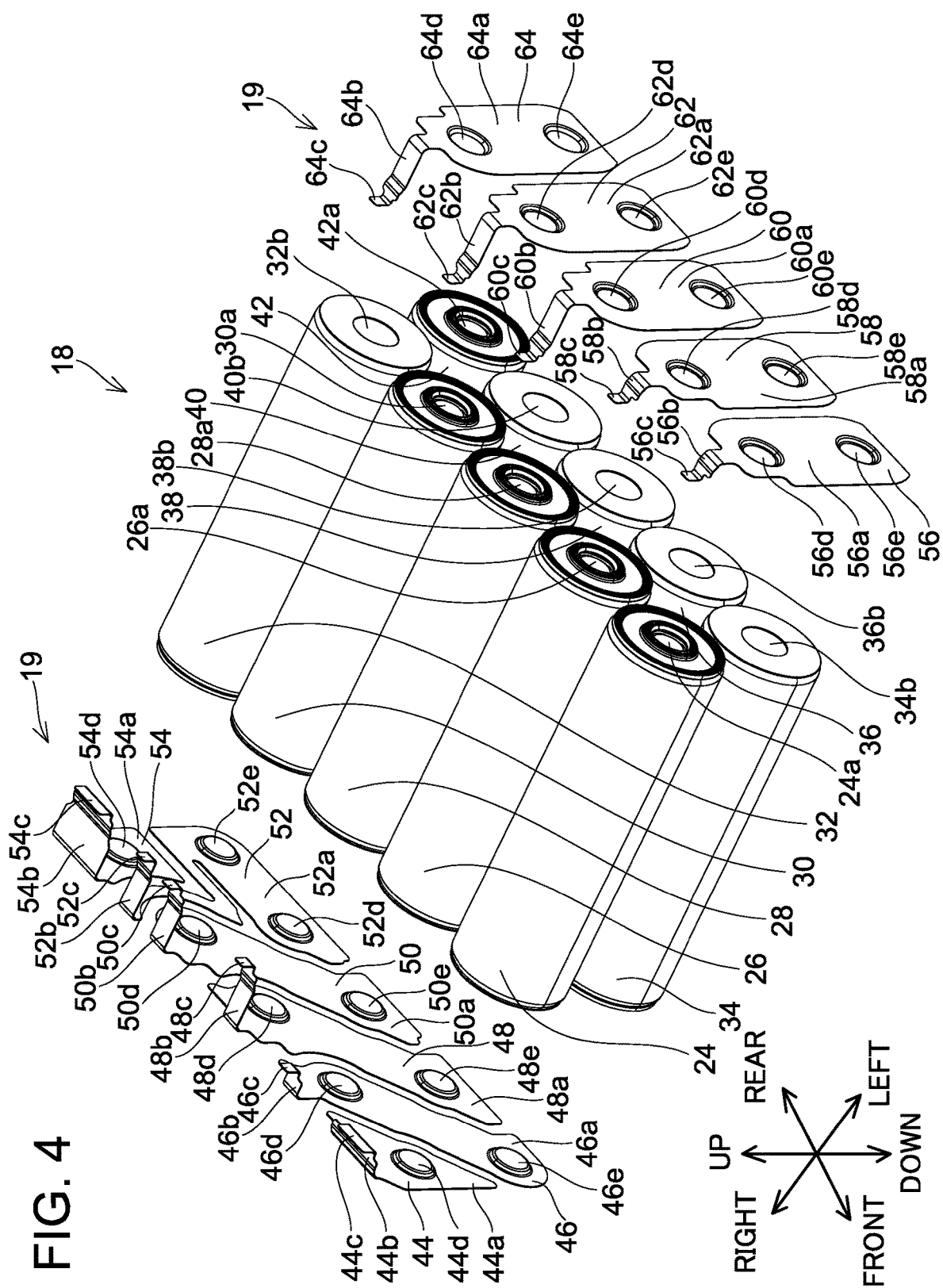
FIG. 4 is an oblique view, viewed from the front, the left, and above, that shows the correspondence relationship between the plurality of battery cells 18 and the plurality of battery tabs 19 of the battery pack 2 according to Working Example 1.
Figure 5:
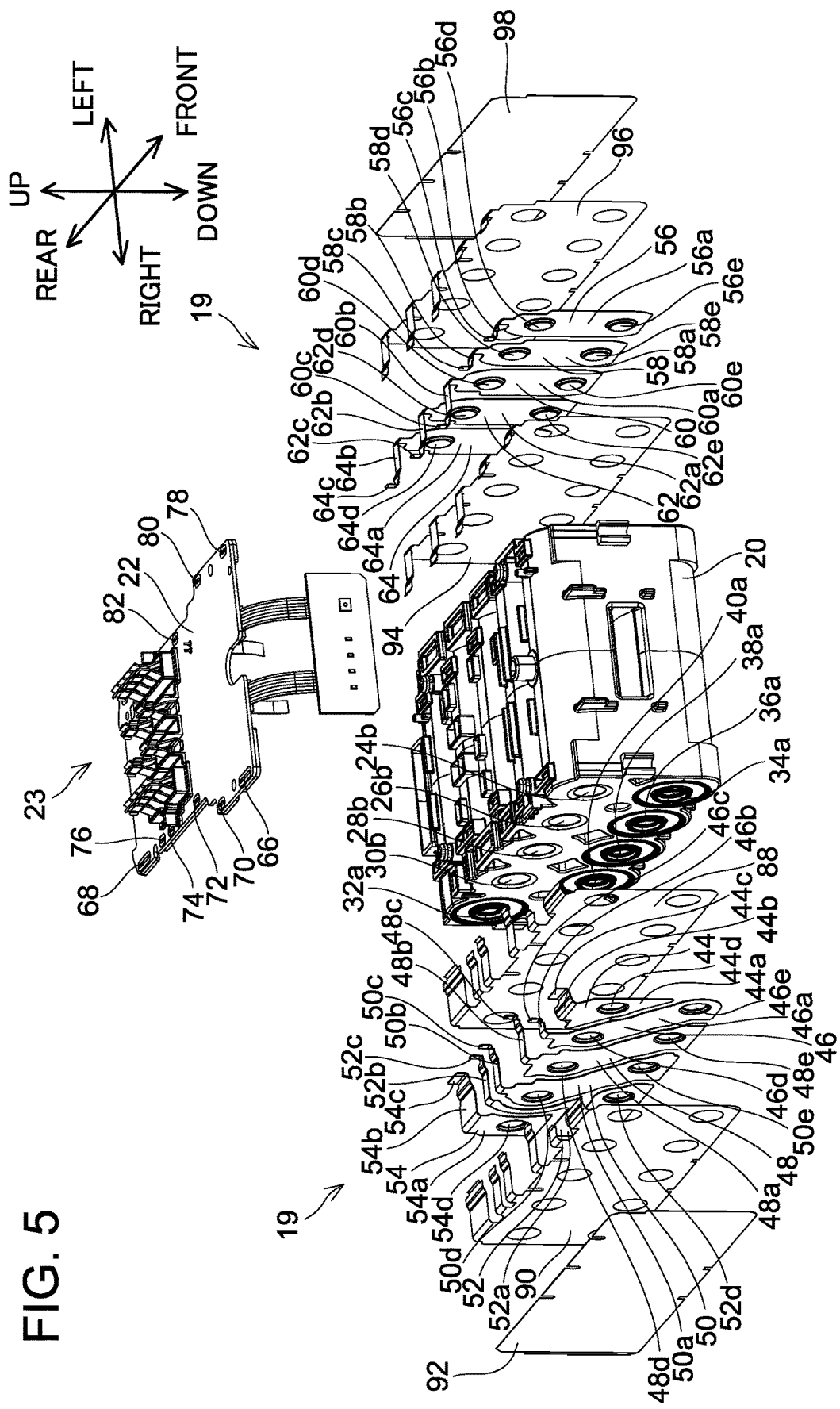
FIG. 5 is an exploded, oblique view, viewed from the front, the right, and above, of the battery-cell unit 12 of the battery pack 2 according to Working Example 1.

As shown in FIGS. 3 and 4, each of the battery cells 18 is, for example, a secondary (rechargeable) battery cell having a substantially circular-column shape and is, for example, a lithium-ion battery cell, although the battery chemistry is not particularly limited in the present teachings. Each of the battery cells 18, for example, has the shape of a 18650-type cell, a rated capacity of 2.0 Ah, and a rated (nominal) voltage of 3.6 V. The battery cells 18 are disposed arrayed in the front-rear direction and the up-down direction such that their longitudinal directions are side-by-side (extend in parallel) in the left-right direction. In the present Working Example 1, the plurality of battery cells 18 comprises a total of 10 battery cells 24, 26, 28, 30, 32, 34, 36, 38, 40, 42, with two across (side-by-side) in the up-down direction and five across (side-by-side) in the front-rear direction. The battery cells 24, 26, 28, 30, 32 are side-by-side (in parallel), from forward to rearward, on the upper-side level of the plurality of battery cells 18, and the battery cells 34, 36, 38, 40, 42 are side-by-side (in parallel), from forward to rearward, on the lower-side level of the plurality of battery cells 18. The battery cells 24, 26, 28, 30, 32, 34, 36, 38, 40, 42 respectively comprise positive electrodes 24a, 26a, 28a, 30a, 32a, 34a, 36a, 38a, 40a, 42a and negative electrodes 24b, 26b, 28b, 30b, 32b, 34b, 36b, 38b, 40b, 42b. As shown in FIG. 5, the battery cells 24, 26, 28, 30, 42 are held by the cell holder 20 such that the positive electrodes 24a, 26a, 28a, 30a, 42a are exposed at a left surface of the cell holder 20 and such that the negative electrodes 24b, 26b, 28b, 30b, 42b are exposed at a right surface of the cell holder 20. The battery cells 32, 34, 36, 38, 40 are held by the cell holder 20 such that the positive electrodes 32a, 34a, 36a, 38a, 40a are exposed at the right surface of the cell holder 20 and such that the negative electrodes 32b, 34b, 36b, 38b, 40b are exposed at the left surface of the cell holder 20.

A plurality of battery tabs 19 is mounted on the plurality of battery cells 18. Each of the battery tabs 19 is a member (structure) that is made of a metal, i.e. an electrically conductive material. Each of the battery tabs 19 is a discrete member that is spaced apart, and thus electrically isolated, from each of the other battery tabs 19 such that there is a gap between adjacent ones of the battery tabs 19. The plurality of battery tabs 19 comprises: battery tabs 44, 46, 48, 50, 52, 54, which are disposed on the right side of the cell holder 20; and battery tabs 56, 58, 60, 62, 64, which are disposed on the left side of the cell holder 20. As shown in FIG. 3, the battery tab 44 comprises a sheet part 44a, a lead part 44b, a circuit-connection part 44c, and a cell-connection part 44d. The battery tab 46 comprises a sheet part 46a, a lead part 46b, a circuit-connection part 46c, and cell-connection parts 46d, 46e. The battery tab 48 comprises a sheet part 48a, a lead part 48b, a circuit-connection part 48c, and cell-connection parts 48d, 48e. The battery tab 50 comprises a sheet part 50a, a lead part 50b, a circuit-connection part 50c, and cell-connection parts 50d, 50e. The battery tab 52 comprises a sheet part 52a, a lead part 52b, a circuit-connection part 52c, and cell-connection parts 52d, 52e. The battery tab 54 comprises a sheet part 54a, a lead part 54b, a circuit-connection part 54c, and a cell-connection part 54d. As shown in FIG. 4, the battery tab 56 comprises a sheet part 56a, a lead part 56b, a circuit-connection part 56c, and cell-connection parts 56d, 56e. The battery tab 58 comprises a sheet part 58a, a lead part 58b, a circuit-connection part 58c, and cell-connection parts 58d, 58e. The battery tab 60 comprises a sheet part 60a, a lead part 60b, a circuit-connection part 60c, and cell-connection parts 60d, 60e. The battery tab 62 comprises a sheet part 62a, a lead part 62b, a circuit-connection part 62c, and cell-connection parts 62d, 62e. The battery tab 64 comprises a sheet part 64a, a lead part 64b, a circuit-connection part 64c, and cell-connection parts 64d, 64e.

As shown in FIG. 3, the cell-connection part 44d of the battery tab 44, the cell-connection parts 46d, 46e of the battery tab 46, the cell-connection parts 48d, 48e of the battery tab 48, the cell-connection parts 50d, 50e of the battery tab 50, the cell-connection parts 52d, 52e of the battery tab 52, and the cell-connection part 54d of the battery tab 54 are respectively spot-welded to the negative electrode 24b of the battery cell 24, the negative electrode 26b of the battery cell 26, the positive electrode 34a of the battery cell 34, the negative electrode 28b of the battery cell 28, the positive electrode 36a of the battery cell 36, the negative electrode 30b of the battery cell 30, the positive electrode 38a of the battery cell 38, the positive electrode 40a of the battery cell 40, the negative electrode 42b of the battery cell 42, and the positive electrode 30a of the battery cell 30.

As shown in FIG. 4, the cell-connection parts 56d, 56e of the battery tab 56, the cell-connection parts 58d, 58e of the battery tab 58, the cell-connection parts 60d, 60e of the battery tab 60, the cell-connection parts 62d, 62e of the battery tab 62, and the cell-connection parts 64d, 64e of the battery tab 64 are respectively spot-welded to the positive electrode 24a of the battery cell 24, the negative electrode 34b of the battery cell 34, the positive electrode 26a of the battery cell 26, the negative electrode 36b of the battery cell 36, the positive electrode 28a of the battery cell 28, the negative electrode 38b of the battery cell 38, the positive electrode 30a of the battery cell 30, the negative electrode 40b of the battery cell 40, the negative electrode 32b of the battery cell 32, and the positive electrode 42a of the battery cell 42.

In the battery pack 2 of the present Working Example 1, the plurality of battery cells 18 and the plurality of battery tabs 19 are electrically series-connected, in order, to the battery tab 44, the battery cell 24, the battery tab 56, the battery cell 34, the battery tab 46, the battery cell 26, the battery tab 58, the battery cell 36, the battery tab 48, the battery cell 28, the battery tab 60, the battery cell 38, the battery tab 50, the battery cell 30, the battery tab 62, the battery cell 40, the battery tab 52, the battery cell 42, the battery tab 64, the battery cell 32, and the battery tab 54.

As shown in FIG. 5, the inner-surface sides of the battery tabs 44, 46, 48, 50, 52, 54, which are disposed on the right side of the cell holder 20, are covered by a film 88, and the outer-surface sides are covered by a film 90. Among the battery tabs 44, 46, 48, 50, 52, 54, the circuit-connection parts 44c, 46c, 48c, 50c, 52c, 54c and the cell-connection parts 44d, 46d, 46e, 48d, 48e, 50d, 50e, 52d, 52e, 54d are not covered by the films 88, 90. Consequently, in the state in which the films 88, 90 are mounted on the battery tabs 44, 46, 48, 50, 52, 54, the cell-connection parts 44d, 46d, 46e, 48d, 48e, 50d, 50e, 52d, 52e, 54d can be spot-welded to the battery cells 24, 26, 28, 30, 32, 34, 36, 38, 40, 42, and the circuit-connection parts 44c, 46c, 48c, 50c, 52c, 54c can be soldered to the control circuit board 22. In addition, a waterproof sheet 92 is adhered to the outer side of the film 90 mounted on the battery tabs 44, 46, 48, 50, 52, 54. The waterproof sheet 92 is composed of, for example, a silicone rubber and reduces the likelihood of electrical shorts among (between) the battery tabs 44, 46, 48, 50, 52, 54 caused by adhesion of moisture, electrically conductive foreign matter, etc.

The inner-surface sides of the battery tabs 56, 58, 60, 62, 64, which are disposed on the right side of the cell holder 20, are covered by a film 94, and the outer-surface sides are covered by a film 96. Among the battery tabs 56, 58, 60, 62, 64, the circuit-connection parts 56c, 58c, 60c, 62c, 64c and the cell-connection parts 56d, 56e, 58d, 58e, 60d, 60e, 62d, 62e, 64d, 64e are not covered by the films 94, 96. Consequently, in the state in which the films 94, 96 are mounted on the battery tabs 56, 58, 60, 62, 64, the cell-connection parts 56d, 56e, 58d, 58e, 60d, 60e, 62d, 62e, 64d, 64e can be spot-welded to the battery cells 24, 26, 28, 30, 32, 34, 36, 38, 40, 42, and the circuit-connection parts 56c, 58c, 60c, 62c, 64c can be soldered to the control circuit board 22. In addition, a waterproof sheet 98 is adhered to the outer side of the film 96 mounted on the battery tabs 56, 58, 60, 62, 64. The waterproof sheet 98 is composed of, for example, a silicone rubber and reduces the likelihood of electrical shorts among (between) the battery tabs 56, 58, 60, 62, 64 caused by adhesion of moisture, electrically conductive foreign matter, etc.

As shown in FIG. 2, the circuit-connection part 44c of the battery tab 44 is inserted through a negative-electrode, power-supply opening 66, which is formed in the control circuit board 22, and is then electrically connected to a negative-electrode, power-supply terminal (not shown) of the control circuit board 22 using solder 66a. The circuit-connection part 54c of the battery tab 54 is inserted through a positive-electrode, power-supply opening 68, which is formed in the control circuit board 22, and is then electrically connected to a positive-electrode, power-supply terminal (not shown) of the control circuit board 22 using solder 68a. The circuit-connection parts 46c, 48c, 50c, 52c, 56c, 58c, 60c, 62c, 64c of the battery tabs 46, 48, 50, 52, 56, 58, 60, 62, 64 are inserted through cell-voltage-detection openings 70, 72, 74, 76, 78, 80, 82, 84, 86, which are formed in the control circuit board 22, and are then electrically connected to cell-voltage-detection terminals (not shown) of the control circuit board 22 using discrete pieces of solder 70a, 72a, 74a, 76a, 78a, 80a, 82a, 84a, 86a.

Because the lead parts 46b, 48b, 50b, 52b, 56b, 58b, 60b, 62b, 64b and the circuit-connection parts 46c, 48c, 50c, 52c, 56c, 58c, 60c, 62c, 64c of the battery tabs 46, 48, 50, 52, 56, 58, 60, 62, 64 are (only) used to detect the cell voltages of the battery cells 18, the currents that flow therethrough are relatively small (low). Consequently, even though the sheet thickness is small (relatively thin), not that much heat is generated, and the temperature does not become so high. In contrast, because the lead parts 44b, 54b and the circuit-connection parts 44c, 54c of the battery tabs 44, 54 are used for charging the plurality of battery cells 18 and for discharging the plurality of battery cells 18, large currents flow therethrough. Consequently, there is a risk that, if the sheet thickness is small at these locations, then the amount of heat generated will become large and the temperature at these locations will become excessively high. Accordingly, in the battery pack 2 of the present Working Example 1, by making the sheet thickness of the battery tabs 44, 54 larger (thicker), the amount of heat generated in the lead parts 44b, 54b, the circuit-connection parts 44c, 54c, etc. is less likely to become excessively large (owing to the reduced electrical resistance of the thicker portions), and thereby the temperature in (at) the lead parts 44b, 54b, the circuit-connection parts 44c, 54c, etc. is less likely to become adversely excessively high.

Figure 6:
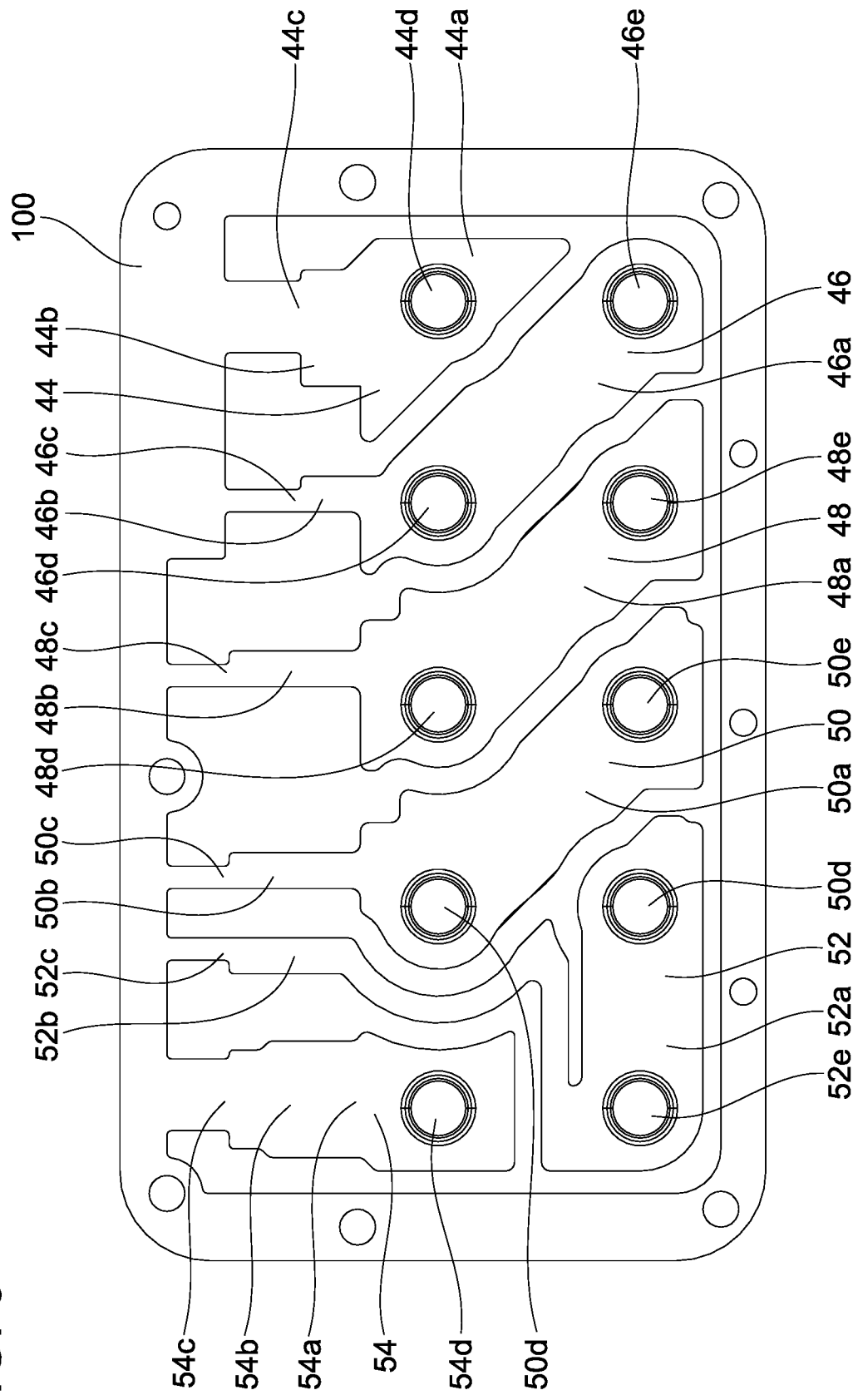
FIG. 6 is a plan view that shows a sheet material 100, which is a template for battery tabs 44, 46, 48, 50, 52, 54, of the battery pack 2 according to Working Example 1.
Figure 7:
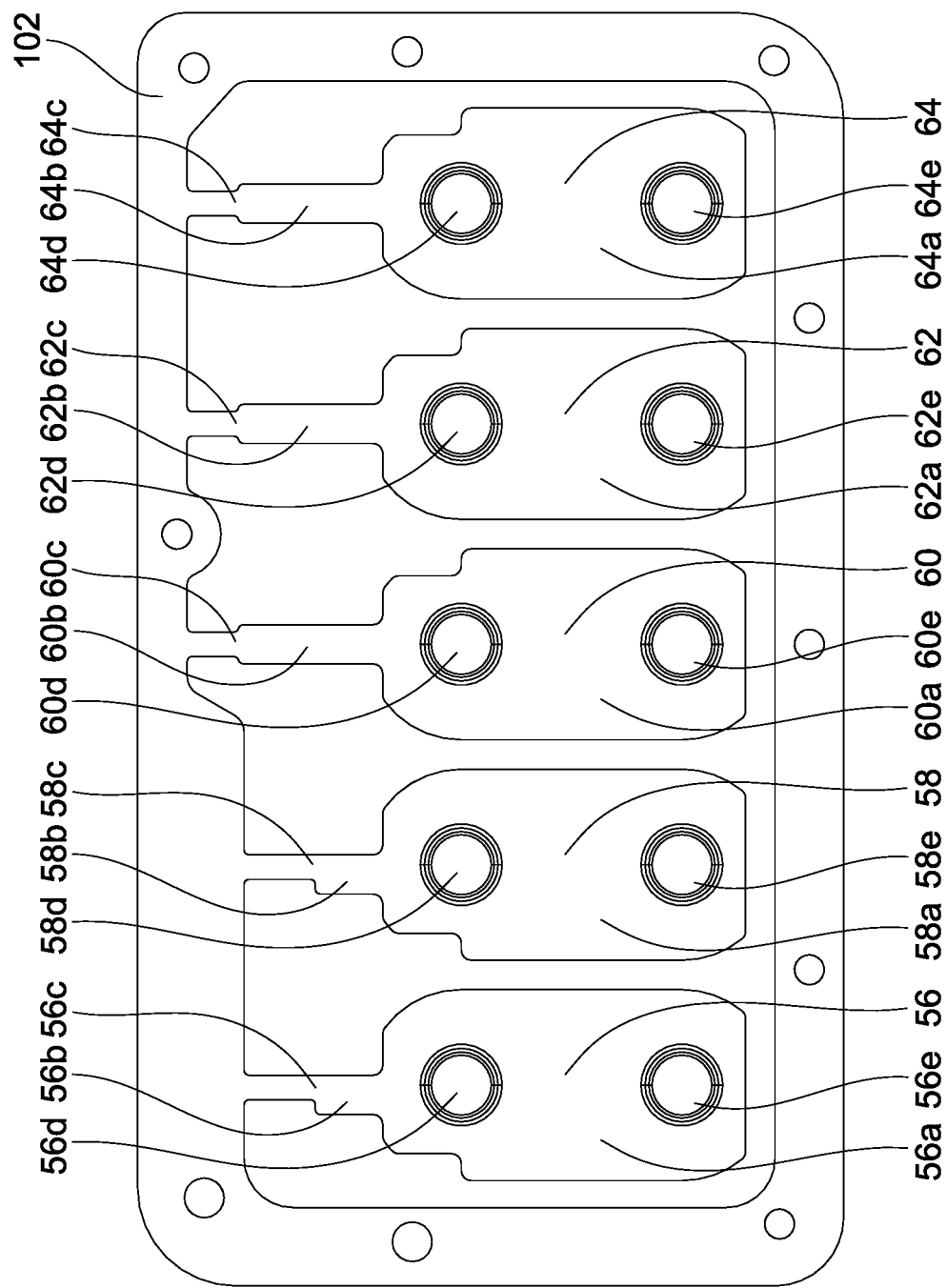
FIG. 7 is a plan view that shows a sheet material 102, which is a template for battery tabs 56, 58, 60, 62, 64, of the battery pack 2 according to Working Example 1.

As shown in FIG. 6, in the battery pack 2 of the present Working Example 1, the battery tabs 44, 46, 48, 50, 52, 54, which are disposed on the right side of the cell holder 20, are formed by punching (i.e. bending and cutting) a single sheet material 100 using a die. In the present Working Example 1, the sheet thickness of the sheet material 100 is, for example, 0.2 mm. In addition, as shown in FIG. 7, in the battery pack 2 of the present Working Example 1, the battery tabs 56, 58, 60, 62, 64, which are disposed on the left side of the cell holder 20, are formed by punching (i.e. bending and cutting) a single sheet material 102 using a die. In the present Working Example 1, the sheet thickness of the sheet material 102 is, for example, 0.15 mm. By adopting such a configuration, the sheet thickness of the battery tabs 44, 54 can be made larger than the sheet thickness of the battery tabs 56, 58, 60, 62, 64. Thereby, it is possible to reduce the likelihood that the amount of heat generated in the lead parts 44b, 54b, the circuit-connection parts 44c, 54c, etc. will become adversely excessively large, and to reduce the likelihood that the temperature of the lead parts 44b, 54b, the circuit-connection parts 44c, 54c, etc. will become adversely excessively high.

Figure 8:
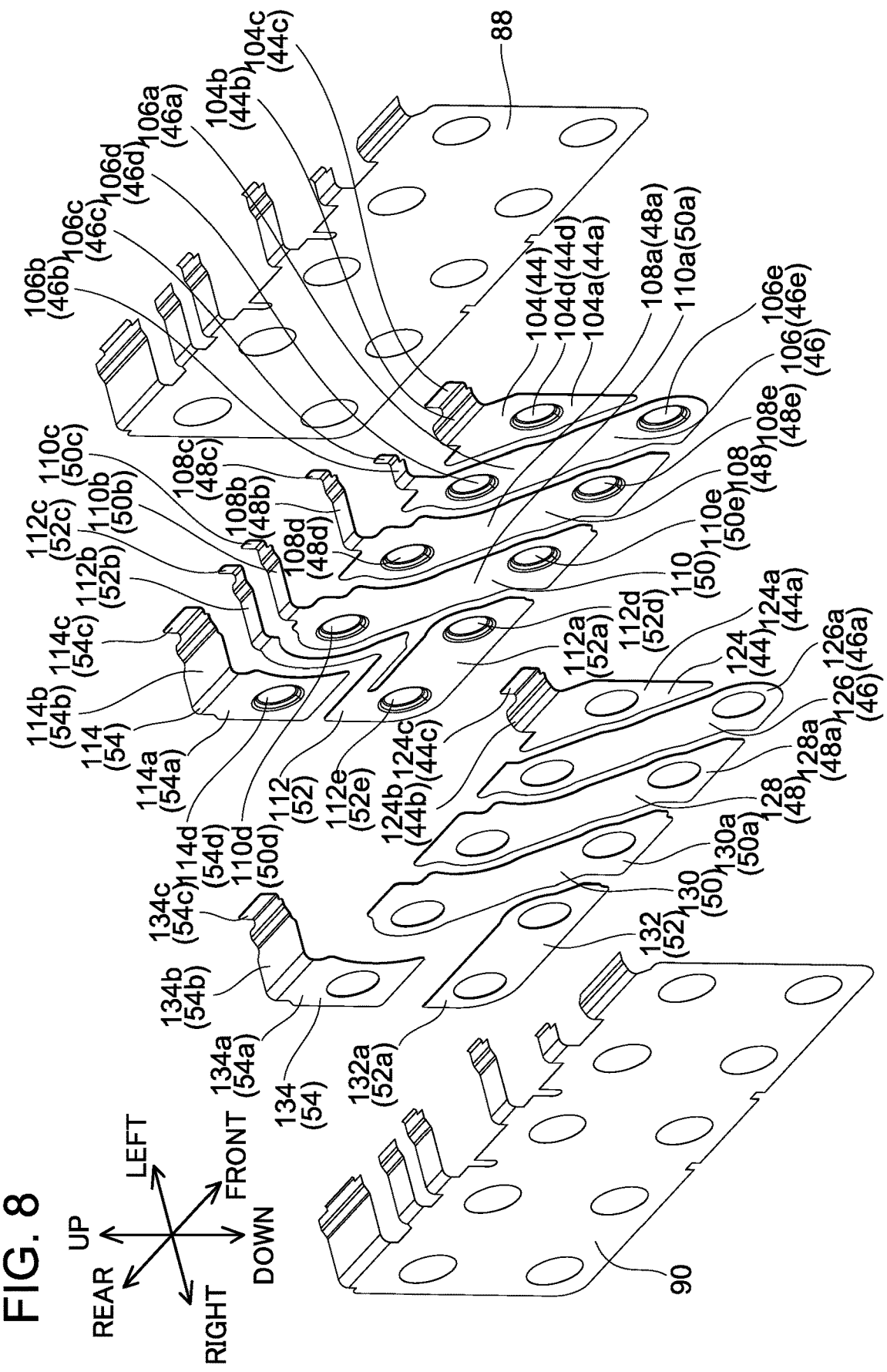
FIG. 8 is an oblique view, viewed from the front, above, and the right, of the battery tabs 44, 46, 48, 50, 52, 54 of the battery pack 2 according to a modified example of Working Example 1.

Alternatively, as shown in FIG. 8, the battery tabs 44, 46, 48, 50, 52, 54 may have a two-layer configuration comprising first sheet materials 104, 106, 108, 110, 112, 114 and second sheet materials 124, 126, 128, 130, 132, 134. The first sheet materials 104, 106, 108, 110, 112, 114 are formed by punching (i.e. bending and cutting) a single sheet material using a die. The sheet thickness of the first sheet materials 104, 106, 108, 110, 112, 114 is, for example, 0.15 mm. The second sheet materials 124, 126, 128, 130, 132, 134 are formed by punching (i.e. bending and cutting) a single sheet material using a die. The sheet thickness of the second sheet materials 124, 126, 128, 130, 132, 134 is, for example, 0.15 mm.

In the example shown in FIG. 8, the first sheet material 104 comprises a sheet part 104a, a lead part 104b, a circuit-connection part 104c, and a cell-connection part 104d; and the second sheet material 124 comprises only a sheet part 124a, a lead part 124b, and a circuit-connection part 124c. The first sheet material 106 comprises a sheet part 106a, a lead part 106b, a circuit-connection part 106c, and cell-connection parts 106d, 106e; and the second sheet material 126 comprises only a sheet part 126a. The first sheet material 108 comprises a sheet part 108a, a lead part 108b, a circuit-connection part 108c, and cell-connection parts 108d, 108e; and the second sheet material 128 comprises only a sheet part 128a. The first sheet material 110 comprises a sheet part 110a, a lead part 110b, a circuit-connection part 110c, and cell-connection parts 110d, 110e; and the second sheet material 130 comprises only a sheet part 130a. The first sheet material 112 comprises a sheet part 112a, a lead part 112b, a circuit-connection part 112c, and cell-connection parts 112d, 112e; and the second sheet material 132 comprises only a sheet part 132a. The first sheet material 114 comprises a sheet part 114a, a lead part 114b, a circuit-connection part 114c, and a cell-connection part 114d; and the second sheet material 134 comprises only a sheet part 134a, a lead part 134b, and a circuit-connection part 134c.

In the configuration shown in FIG. 8, the sheet thickness of the lead parts 44b, 54b and the circuit-connection parts 44c, 54c of the battery tabs 44, 54 is calculated by adding the sheet thickness (e.g., 0.15 mm) of the lead parts 104b, 114b and the circuit-connection parts 104c, 114c of the first sheet materials 104, 114 and the sheet thickness (e.g., 0.15 mm) of the lead parts 124b, 134b and the circuit-connection parts 124c, 134c of the second sheet materials 124, 134. By adopting such a configuration, it is possible to reduce the amount of heat generated in the lead parts 44b, 54b and the circuit-connection parts 44c, 54c and thus to reduce the likelihood that the temperature of the lead parts 44b, 54b and the circuit-connection parts 44c, 54c will become adversely excessively high. It is noted that the battery tabs 56, 58, 60, 62, 64 (refer to FIG. 3) may likewise be configured the same as the battery tabs 46, 48, 50, 52 shown in FIG. 8.

Figure 9:
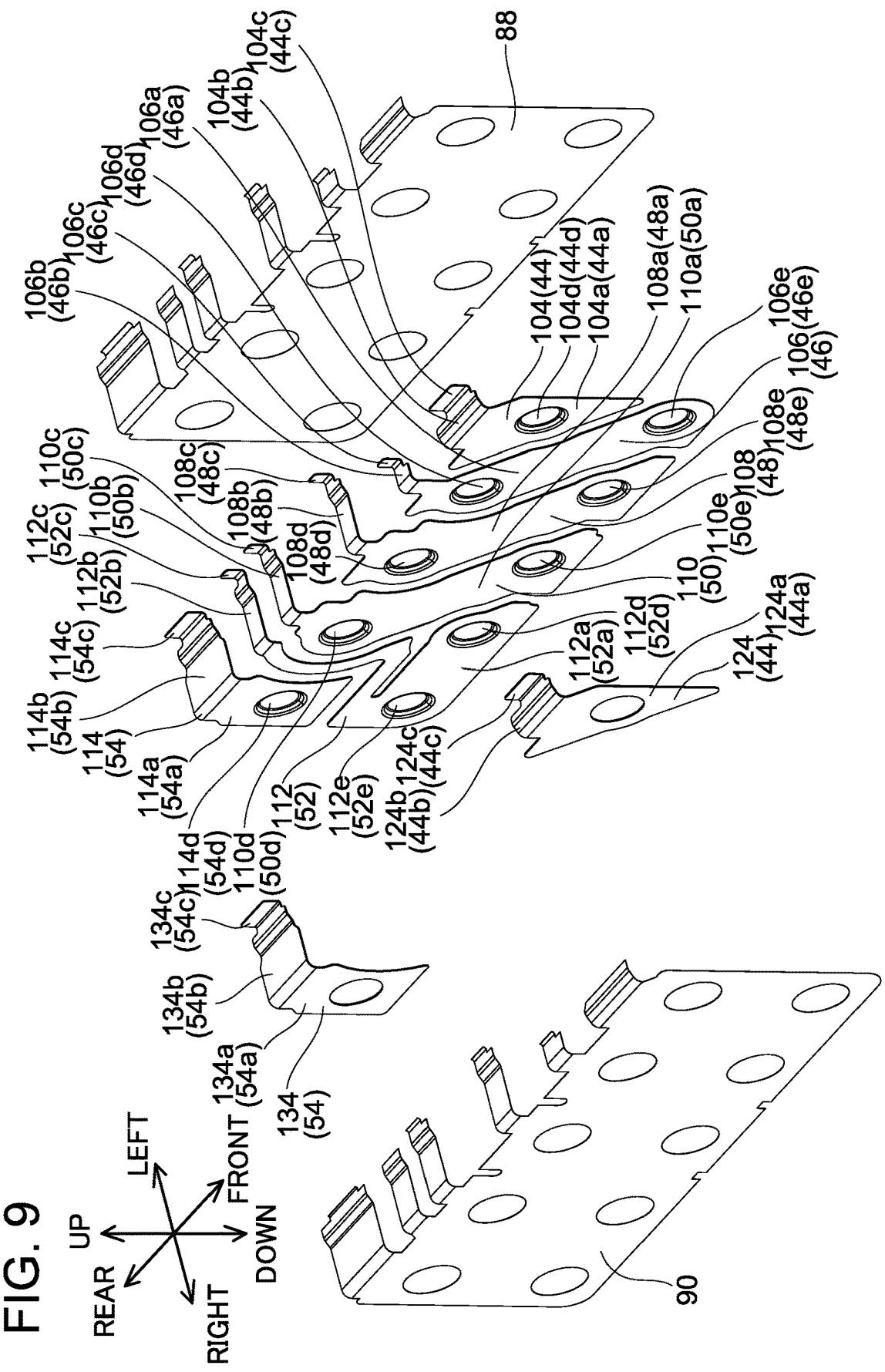
FIG. 9 is an oblique view, viewed from the front, above, and the right, of the battery tabs 44, 46, 48, 50, 52, 54 of the battery pack 2 according to another modified example of Working Example 1.

Alternatively, as shown in FIG. 9, only the battery tabs 44, 54 may have a two-layer configuration comprising the first sheet materials 104, 114 and the second sheet materials 124, 134. In the configuration shown in FIG. 9 as well, the sheet thickness of the lead parts 44b, 54b and the circuit-connection parts 44c, 54c of the battery tabs 44, 54 is calculated by adding the sheet thickness (e.g., 0.15 mm) of the lead parts 104b, 114b and the circuit-connection parts 104c, 114c of the first sheet materials 104, 114 and the sheet thickness (e.g., 0.15 mm) of the lead parts 124b, 134b and the circuit-connection parts 124c, 134c of the second sheet materials 124, 134. By adopting such a configuration, it is possible to reduce the amount of heat generated in the lead parts 44b, 54b and the circuit-connection parts 44c, 54c and thus to reduce the likelihood that the temperature of the lead parts 44b, 54b and the circuit-connection parts 44c, 54c will become adversely excessively high.

In one or more embodiments as described above, the battery pack 2 (one non-limiting example of a battery apparatus according to the present teachings) comprises: the plurality of battery cells 24, 26, 28, 30, 32, 34, 36, 38, 40, 42 respectively having the positive electrodes 24a, 26a, 28a, 30a, 32a, 34a, 36a, 38a, 40a, 42a and the negative electrodes 24b, 26b, 28b, 30b, 32b, 34b, 36b, 38b, 40b, 42b; and the plurality of battery tabs 44, 46, 48, 50, 52, 54, 56, 58, 60, 62, 64 respectively having the cell-connection parts 44d, 46d, 46e, 48d, 48e, 50d, 50e, 52d, 52e, 54d, 56d, 56e, 58d, 58e, 60d, 60e, 62d, 62e, 64d, 64e (one non-limiting example of at least one cell-connection part according to the present teachings), which are electrically connected to the positive electrodes 24a, 26a, 28a, 30a, 32a, 34a, 36a, 38a, 40a, 42a or the negative electrodes 24b, 26b, 28b, 30b, 32b, 34b, 36b, 38b, 40b, 42b of a respective one of the battery cells 24, 26, 28, 30, 32, 34, 36, 38, 40, 42, and the sheet parts 44a, 46a, 48a, 50a, 52a, 54a, 56a, 58a, 60a, 62a, 64a, which are integrally formed with the cell-connection parts 44d, 46d, 46e, 48d, 48e, 50d, 50e, 52d, 52e, 54d, 56d, 56e, 58d, 58e, 60d, 60e, 62d, 62e, 64d, 64e. Each of the battery tabs 44, 46, 48, 50, 52, 54, 56, 58, 60, 62, 64 is either (one of) the first-type (first) battery tab or the second-type (second) battery tab. The sheet thickness of at least one portion (e.g., the lead parts 44b, 54b) of the first-type battery tab (e.g., the battery tabs 44, 54) is larger than the sheet thickness of at least one portion (e.g., the lead parts 56b, 64b) of the second-type battery tab (e.g., the battery tabs 56, 64).

The locations of each battery tab of the plurality of battery tabs 44, 46, 48, 50, 52, 54, 56, 58, 60, 62, 64 undergo temperature increases owing to the generation of heat when electric current flows therethrough. If the sheet thickness is small at a location or locations where the electric current is flowing, electrical resistance is high; therefore, the amount of heat generated tends to be larger and thereby the temperature of the battery tab(s) tends to rise. Conversely, if the sheet thickness is large (larger) at a location or locations where the electric current is flowing, electrical resistance is low (lower); therefore, the amount of heat generated tends to be small (smaller) and thereby the temperature of the battery tab(s) tends not to rise. According to the above-described configuration, because the first-type battery tabs (e.g., the battery tabs 44, 54) are used at locations where the temperature might otherwise tend to become high, the sheet thickness is made larger at locations (e.g., the lead parts 44b, 54b) where the temperature might otherwise become high; therefore, less heat is generated at such locations and thereby a rise in the temperature of the battery tab(s) can be curtailed. Consequently, it is possible to reduce the likelihood that any of the battery tabs 44, 46, 48, 50, 52, 54, 56, 58, 60, 62, 64 reaches an excessively high temperature, e.g., during a charging or discharging operation.

In one or more embodiments, the battery pack 2 is configured such that the electric current that flows through the at least one portion (e.g., the lead parts 44b, 54b) of the first-type battery tab (e.g., the battery tabs 44, 54) is larger than the (maximum) electric current that flows through the at least one portion (e.g., the lead parts 56b, 64b) of the second-type battery tab (e.g., the battery tabs 56, 64).

Among the battery tabs 44, 46, 48, 50, 52, 54, 56, 58, 60, 62, 64, because a relatively large amount of heat is typically generated at locations where a large current flows, the temperature will tend to rise unless a suitable countermeasure is utilized. On the other hand, because a relatively small amount of heat is generated at locations where a much smaller current flows, the temperature tends not to rise at such locations and the battery tabs at such locations may be relatively thin, thereby reducing weight and material costs. According to the above-described configuration, among the battery tabs 44, 46, 48, 50, 52, 54, 56, 58, 60, 62, 64, by increasing the sheet thickness at the locations (e.g., the lead parts 44b, 54b) where a large current is expected to flow, the amount of heat generated at such locations can be reduced, thereby curtailing a rise in temperature of such battery tabs. Consequently, it is possible to reduce the likelihood that any of the battery tabs 44, 46, 48, 50, 52, 54, 56, 58, 60, 62, 64 will reach an excessively high temperature, e.g., during a charging or discharging operation, in which relatively large currents flow.

In one or more embodiments, the battery pack 2 further comprises the control circuit board 22 (one non-limiting example of a circuit board according to the present teachings). The plurality of battery tabs 44, 46, 48, 50, 52, 54, 56, 58, 60, 62, 64 further includes the circuit-connection parts 44c, 46c, 48c, 50c, 52c, 54c, 56c, 58c, 60c, 62c, 64c, which are electrically connected to the control circuit board 22, and the lead parts 44b, 46b, 48b, 50b, 52b, 54b, 56b, 58b, 60b, 62b, 64b, which are integrally formed with the circuit-connection parts 44c, 46c, 48c, 50c, 52c, 54c, 56c, 58c, 60c, 62c, 64c and with the sheet parts 44a, 46a, 48a, 50a, 52a, 54a, 56a, 58a, 60a, 62a, 64a. The at least one (thicker) portion of the first-type battery tab (e.g., the battery tabs 44, 54) includes the lead part (e.g., the lead parts 44b, 54b) of the first-type battery tab (e.g., the battery tabs 44, 54). The at least one portion of the second-type battery tab (e.g., the battery tabs 56, 64) includes the lead part (e.g., the lead parts 56b, 64b) of the second-type battery tab (e.g., the battery tabs 56, 64).

When the circuit-connection parts 44c, 46c, 48c, 50c, 52c, 54c, 56c, 58c, 60c, 62c, 64c of the battery tabs 44, 46, 48, 50, 52, 54, 56, 58, 60, 62, 64 are electrically connected to the control circuit board 22, some of the battery tabs 44, 46, 48, 50, 52, 54, 56, 58, 60, 62, 64 will conduct a relatively large current that flows to some of the lead parts 44b, 46b, 48b, 50b, 52b, 54b, 56b, 58b, 60b, 62b, 64b and some will conduct a relatively small current that flows to others of the lead parts 44b, 46b, 48b, 50b, 52b, 54b, 56b, 58b, 60b, 62b, 64b. According to the above-described configuration, by using the first-type battery tabs (e.g., the battery tabs 44, 54) for conducting large currents that flow to some of the lead parts (e.g., the lead parts 44b, 54b), the sheet thickness of those lead parts (e.g., the lead parts 44b, 54b) can be made larger; therefore, less heat generated in those lead parts (e.g., the lead parts 44b, 54b) (as compared to thinner battery tabs), thereby curtailing a rise in the temperature of such battery tabs. Consequently, it is possible to reduce the likelihood that any of the battery tabs 44, 46, 48, 50, 52, 54, 56, 58, 60, 62, 64 will reach an excessively high temperature, e.g., during a charging or discharging operation, in which relatively large currents flow.

In one or more embodiments, the at least one (thicker) portion of the first-type battery tab (e.g., the battery tabs 44, 54) includes the circuit-connection part (e.g., the circuit-connection parts 44c, 54c) of the first-type battery tab (e.g., the battery tabs 44, 54). The at least one portion of the second-type battery tab (e.g., the battery tabs 56, 64) includes the circuit-connection part (e.g., the circuit-connection parts 56c, 64c) of the second-type battery tab (e.g., the battery tabs 56, 64).

When the circuit-connection parts 44c, 46c, 48c, 50c, 52c, 54c, 56c, 58c, 60c, 62c, 64c of the battery tabs 44, 46, 48, 50, 52, 54, 56, 58, 60, 62, 64 are electrically connected to the control circuit board 22, some of the battery tabs 44, 46, 48, 50, 52, 54, 56, 58, 60, 62, 64 will conduct a relatively large current that flows to some of the circuit-connection parts 44c, 46c, 48c, 50c, 52c, 54c, 56c, 58c, 60c, 62c, 64c, and some will conduct a smaller current that flows to others of the circuit-connection parts 44c, 46c, 48c, 50c, 52c, 54c, 56c, 58c, 60c, 62c, 64c. According to the above-described configuration, by using the first-type battery tabs (e.g., the battery tabs 44, 54) to conduct the relatively large currents that flow to some of the circuit-connection parts (e.g., the circuit-connection parts 44c, 54c), the sheet thickness of those circuit-connection parts (e.g., the circuit-connection parts 44c, 54c) can be made larger; therefore, less heat will be generated in those circuit-connection parts (e.g., the circuit-connection parts 44c, 54c) (as compared to thinner battery tabs), thereby reducing an expected rise in the temperature of such battery tabs. Consequently, it is possible to reduce the likelihood that any of the battery tabs 44, 46, 48, 50, 52, 54, 56, 58, 60, 62, 64 will reach an excessively high temperature.

In one or more embodiments, a width of the circuit-connection part (e.g., the circuit-connection parts 44c, 54c) of the first-type battery tab (e.g., the battery tabs 44, 54) is smaller than the (maximum) width of the lead part (e.g., the lead parts 44b, 54b) of the first-type battery tab (e.g., the battery tabs 44, 54).

With regard to each of the battery tabs (e.g., the battery tabs 44, 54), if the width of the circuit-connection part (e.g., the circuit-connection parts 44c, 54c) is smaller (less) than the width of the lead part (e.g., the lead parts 44b, 54b), the electrical resistance of the circuit-connection part (e.g., the circuit-connection parts 44c, 54c) is larger; therefore, the amount of heat generated is larger (for the same current that is conducted), which will typically lead to greater temperature increases in the narrower circuit-connection parts (for the same current). According to the above-described configuration, by using the first-type battery tabs (e.g., the battery tabs 44, 54), the sheet thickness of those circuit-connection parts (e.g., the circuit-connection parts 44c, 54c) can be made larger and the electrical resistance of those circuit-connection parts (e.g., the circuit-connection parts 44c, 54c) is reduced; therefore, the amount of heat generated at (in) those circuit-connection parts (e.g., the circuit-connection parts 44c, 54c) can be reduced and thereby a rise in the temperature of such first-type battery tabs can be curtailed. Consequently, none of the battery tabs 44, 46, 48, 50, 52, 54, 56, 58, 60, 62, 64 is likely to reach an excessively high temperature, e.g., during a charging or discharging operation, in which a larger current.

In one or more embodiments, a width of the circuit-connection part (e.g., the circuit-connection parts 44c, 54c) of the first-type battery tab (e.g., the battery tabs 44, 54) is smaller than the (maximum) width of the sheet part (e.g., the sheet parts 44a, 54a) of the first-type battery tab (e.g., the battery tabs 44, 54).

With regard to each of the battery tabs (e.g., the battery tabs 44, 54), if the width of the circuit-connection part (e.g., the circuit-connection parts 44c, 54c) is smaller than the width of the sheet part (e.g., the sheet parts 44a, 54a), the electrical resistance of the circuit-connection part (e.g., the circuit-connection parts 44c, 54c) is large; therefore, the amount of heat generated is large (for the same current that is conducted), which will typically lead to greater temperature increases in the narrower circuit-connection parts (for the same current). According to the above-described configuration, by using the first-type battery tabs (e.g., the battery tabs 44, 54), the sheet thickness of those circuit-connection parts (e.g., the circuit-connection parts 44c, 54c) can be made larger and the electrical resistance of those circuit-connection parts (e.g., the circuit-connection parts 44c, 54c) is reduced; therefore, the amount of heat generated at (in) those circuit-connection parts (e.g., the circuit-connection parts 44c, 54c) can be reduced and thereby a rise in the temperature of such first-type battery tabs can be curtailed. Consequently, the battery tabs 44, 46, 48, 50, 52, 54, 56, 58, 60, 62, 64 are less likely to reach an excessively high temperature.

In one or more embodiments, the control circuit board 22 comprises: a positive-electrode, power-supply terminal and a negative-electrode, power-supply terminal, which are for charging the plurality of battery cells 24, 26, 28, 30, 32, 34, 36, 38, 40, 42 and for discharging the plurality of battery cells 24, 26, 28, 30, 32, 34, 36, 38, 40, 42; and cell-voltage-detection terminals, which are for detecting the cell voltages of the battery cells of the plurality of battery cells 24, 26, 28, 30, 32, 34, 36, 38, 40, 42. Each of the circuit-connection parts (e.g., the circuit-connection parts 44c, 54c) of the first-type battery tabs (e.g., the battery tabs 44, 54) is electrically connected to the positive-electrode, power-supply terminal or to the negative-electrode, power-supply terminal. The circuit-connection parts (e.g., the circuit-connection parts 56c, 64c) of the second-type battery tabs (e.g., the battery tabs 56, 64) are electrically connected to the cell-voltage-detection terminals.

In the above-described configuration, relatively large electric currents flow to the lead parts (e.g., the lead parts 44b, 54b), the circuit-connection parts (e.g., the circuit-connection parts 44c, 54c), and the like of the first-type battery tabs (e.g., the battery tabs 44, 54) while charging and discharging the plurality of battery cells 24, 26, 28, 30, 32, 34, 36, 38, 40, 42. In contrast, smaller currents flow to the lead parts (e.g., the lead parts 56b, 64b), the circuit-connection parts (e.g., the circuit-connection parts 56c, 64c), and the like of the second-type battery tabs (e.g., the battery tabs 56, 64) while detecting the cell voltages of the plurality of battery cells 24, 26, 28, 30, 32, 34, 36, 38, 40, 42. According to the above-described configuration, from among the plurality of battery tabs 44, 46, 48, 50, 52, 54, 56, 58, 60, 62, 64, the battery tabs (e.g., the battery tabs 44, 54) through which large currents flow to the lead parts (e.g., the lead parts 44b, 54b), the circuit-connection parts (e.g., the circuit-connection parts 44c, 54c), and the like are configured as first-type battery tabs and thereby the sheet thickness of those lead parts (e.g., the lead parts 44b, 54b), circuit-connection parts (e.g., the circuit-connection parts 44c, 54c), and the like is made larger; therefore, the amount of heat generated in those lead parts (e.g., the lead parts 44b, 54b), circuit-connection parts (e.g., the circuit-connection parts 44c, 54c), and the like can be reduced and thereby a rise in temperature can be curtailed. Consequently, this aspect of the present teachings also helps to ensure that none of the battery tabs 44, 46, 48, 50, 52, 54, 56, 58, 60, 62, 64 reaches an excessively high temperature during usage of the battery pack 2.

In one or more embodiments, the plurality of battery cells 24, 26, 28, 30, 32, 34, 36, 38, 40, 42 includes the battery cell 24 (or the battery cell 32) (one non-limiting example of a first battery cell according to the present teachings). The battery tab 44 (or the battery tab 54) electrically connected to the negative electrode 24b of the battery cell 24 (or the positive electrode 32a of the battery cell 32) is configured as the first-type battery tab. The battery tab 56 (or the battery tab 64) electrically connected to the positive electrode 24a of the battery cell 24 (or the negative electrode 32b of the battery cell 32) is configured as the second-type battery tab.

The temperature of the battery tab 44, among the battery tabs 44, 56 (or the battery tabs 54, 64) electrically connected to the battery cell 24 (or the battery cell 32), that is electrically connected to the negative electrode 24b (or the battery tab 54 electrically connected to the positive electrode 32a) is prone to become high owing to conducting relatively large currents during a charging or discharging operation, whereas the temperature of the battery tab 56 electrically connected to the positive electrode 24a (or the battery tab 64 electrically connected to the negative electrode 32b) tends not to become high, because large currents do not flow through battery tab 56. According to the above-described configuration, the battery tab 44 (or the battery tab 54), among the battery tabs 44, 56 (or the battery tabs 54, 64) electrically connected to the battery cell 24 (or the battery cell 32), whose temperature might otherwise become high during a charging or discharging operation is configured as the first-type battery tab and thereby its sheet thickness is made larger; therefore, the amount of heat generated can be reduced, and a rise in the temperature of the battery tab 44 (or the battery tab 54) can be curtailed. Consequently, none of the battery tabs 44, 46, 48, 50, 52, 54, 56, 58, 60, 62, 64 are likely to reach an excessively high temperature during usage of the battery pack 2.

In one or more embodiments, each of the plurality of battery cells 24, 26, 28, 30, 32, 34, 36, 38, 40, 42 has a substantially circular-column shape extending in a longitudinal direction, the positive electrodes 24a, 26a, 28a, 30a, 32a, 34a, 36a, 38a, 40a, 42a thereof are disposed at one end portion in the longitudinal direction, the negative electrodes 24b, 26b, 28b, 30b, 32b, 34b, 36b, 38b, 40b, 42b are disposed at the other end portion in the longitudinal direction, and they are arranged side-by-side such that the longitudinal directions are side-by-side (in parallel) in the left-right direction (one non-limiting example of a first direction according to the present teachings). On the right side, the battery tabs 44, 46, 48, 50, 52, 54 electrically connected to the positive electrodes 32a, 34a, 36a, 38a, 40a or the negative electrodes 24b, 26b, 28b, 30b, 42b of the plurality of battery cells 24, 26, 28, 30, 32, 34, 36, 38, 40, 42 are configured as the first-type battery tabs. On the left side, the battery tabs 56, 58, 60, 62, 64 electrically connected to the positive electrodes 24a, 26a, 28a, 30a, 42a or the negative electrodes 32b, 34b, 36b, 38b, 40b of the plurality of battery cells 24, 26, 28, 30, 32, 34, 36, 38, 40, 42 are configured as the second-type battery tabs.

According to the above-mentioned configuration, the battery tabs 44, 46, 48, 50, 52, 54 on the right side can be manufactured with a common specification, and the battery tabs 56, 58, 60, 62, 64 on the left side can be manufactured with a common specification; therefore, the manufacture of the battery pack 2 can be made even easier.

In one or more embodiments, the first-type battery tabs (e.g., the battery tabs 44, 54) are composed of a single sheet material and the second-type battery tabs (e.g., the battery tabs 56, 64) are composed of a single sheet material (e.g., the sheet materials 101, 102). The entire (overall) sheet thickness of the first-type battery tabs (e.g., the battery tabs 44, 54) is greater than the entire (overall) sheet thickness of the second-type battery tabs (e.g., the battery tabs 56, 64).

According to the above-described configuration, the sheet thickness of the first-type battery tabs (e.g., the battery tabs 44, 54) can be made larger, to achieve a reduced electrical resistance, without increasing the part count of the battery pack 2.

In one or more embodiments, each of the first-type battery tabs (e.g., the battery tabs 44, 54) is composed of the first sheet material (e.g., the first sheet materials 104, 114) that is overlaid (superimposed) on the second sheet material (e.g., the second sheet materials 124, 134).

According to the above-described configuration, the sheet thickness of the first-type battery tabs (e.g., the battery tabs 44, 54) can be made larger using a simple configuration.

In one or more embodiments, the first sheet material (e.g., the first sheet materials 104, 114) has the first cell-connection part (e.g., the cell-connection parts 104d, 114d) corresponding to the cell-connection part. The second sheet material (e.g., the second sheet materials 124, 134) does not have a portion corresponding to a cell-connection part.

According to the above-described configuration, the assembly work of joining (electrically and physically connecting) the first cell-connection parts (e.g., the cell-connection parts 104d, 114d) and the battery cells (e.g., the battery cells 24, 32) can be performed in the state in which the second sheet material (e.g., the second sheet materials 124, 134) is overlaid on the first sheet material (e.g., the first sheet materials 104, 114).

In one or more embodiments, the battery pack 2 further comprises the control circuit board 22 (example of the circuit board). The plurality of battery tabs 44, 46, 48, 50, 52, 54, 56, 58, 60, 62, 64 further comprises the circuit-connection parts 44c, 46c, 48c, 50c, 52c, 54c, 56c, 58c, 60c, 62c, 64c electrically connected to the control circuit board 22. Each of the first-type battery tabs (e.g., the battery tabs 44, 54) comprises the first sheet material (e.g., the first sheet materials 104, 114) and the second sheet material (e.g., the second sheet materials 124, 134), which overlays the first sheet material. The first sheet material comprises the first circuit-connection part (e.g., the circuit-connection parts 104c, 114c) corresponding to the circuit-connection part. The second sheet material comprises the second circuit-connection part (e.g., the circuit-connection parts 124c, 134c) corresponding to the circuit-connection part. The first circuit-connection part and the second circuit-connection part are joined to the control circuit board 22 by a common solder (e.g., the solder 66a, 68a).

According to the above-described configuration, the soldering of the first circuit-connection part (e.g., the circuit-connection parts 104c, 114c) to the control circuit board 22 and the soldering of the second circuit-connection part (e.g., the circuit-connection parts 124c, 134c) to the control circuit board 22 can be performed using a common process. Consequently, the manufacture of the battery pack 2 can be made even simpler.

In one or more embodiments, the first circuit-connection part (e.g., the circuit-connection parts 104c, 114c) and the second circuit-connection part (e.g., the circuit-connection parts 124c, 134c) are inserted through a common through hole (e.g., the negative-electrode, power-supply opening 66 and the positive-electrode, power-supply opening 68), which is formed in the control circuit board 22.

According to the above-described configuration, compared with an embodiment in which the through hole through which the first circuit-connection part (e.g., the circuit-connection parts 104c, 114c) is inserted and the through hole through which the second circuit-connection part (e.g., the circuit-connection parts 124c, 134c) is inserted are provided separately in the control circuit board 22, a larger mount-surface area for the control circuit board 22 can be ensured.

In one or more embodiments, the battery pack 2 further comprises the control circuit board 22. The plurality of battery tabs 44, 46, 48, 50, 52, 54, 56, 58, 60, 62, 64 further comprises the circuit-connection parts 44c, 46c, 48c, 50c, 52c, 54c, 56c, 58c, 60c, 62c, 64c electrically connected to the control circuit board 22. The first-type battery tabs (e.g., the battery tabs 46, 48, 50, 52) are composed of the first sheet material (e.g., the first sheet materials 106, 108, 110, 112) and the second sheet material (e.g., the second sheet materials 126, 128, 130, 132), which overlays the first sheet material. The first sheet material (e.g., the first sheet materials 106, 108, 110, 112) comprises the first circuit-connection part (e.g., the circuit-connection parts 106c, 108c, 110c, 112c) corresponding to the circuit-connection part. The second sheet material (e.g., the second sheet materials 126, 128, 130, 132) does not have a portion corresponding to a circuit-connection part.

According to the above-described configuration, compared with an embodiment in which both the first sheet material (e.g., the first sheet materials 106, 108, 110, 112) and the second sheet material (e.g., the second sheet materials 126, 128, 130, 132) are joined to the control circuit board 22, a larger mount-surface area for the control circuit board 22 can be ensured.

Working Example 2

Figure 10:
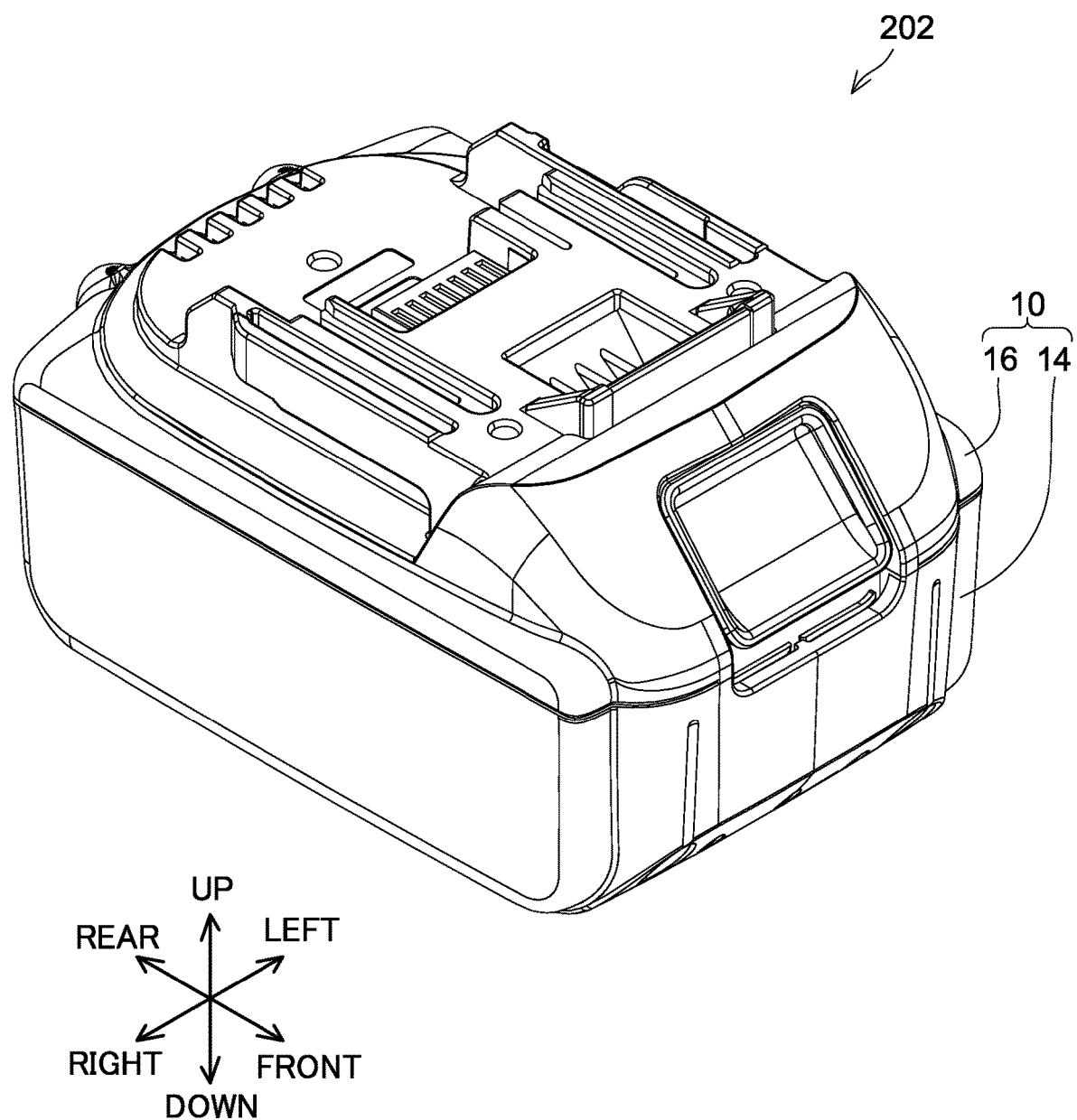
FIG. 10 is an oblique view, viewed from the front, the right, and above, of a battery pack 202 according to Working Example 2.

A battery pack 202 according to the present Working Example 1, which is shown in FIG. 10, has substantially the same configuration as that of the battery pack 2 of Working Example 1. Hereinbelow, structural elements that are the same as those in the battery pack 2 of Working Example 1 are assigned the same symbols, and detailed explanation thereof is omitted. The rated (nominal) voltage of the battery pack 202 is, for example, 18 V. The maximum voltage of the battery pack 202 is, for example, 20 V. The rated (nominal) capacity of the battery pack 2 is, for example, 4.0 Ah.

The battery pack 202 comprises the casing (case, housing) 10 and the battery-cell unit 12 (refer to FIG. 11), which is housed in the interior of the casing 10. The casing 10 comprises the lower casing (shell) 14 and the upper casing (shell) 16.

Figure 11:
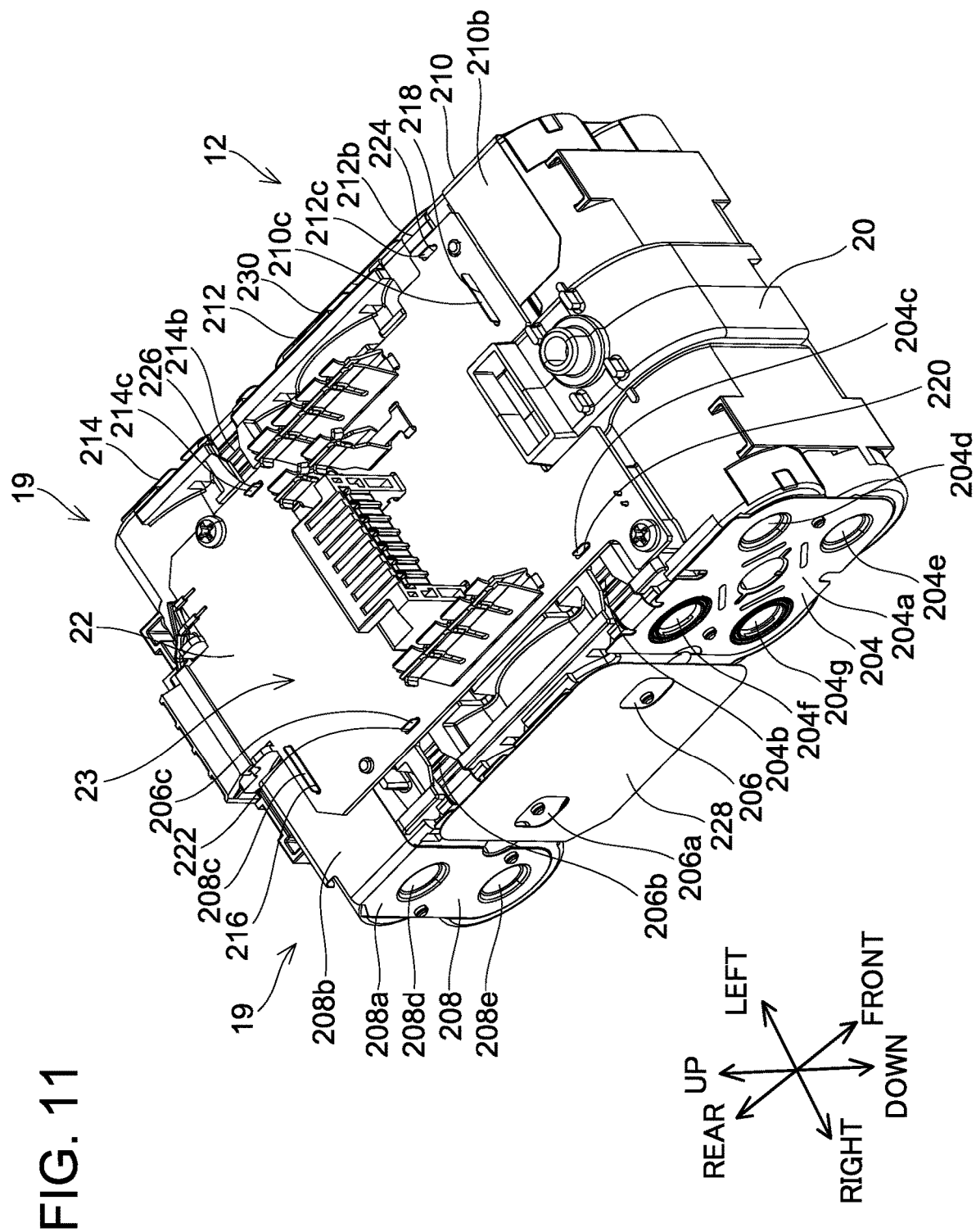
FIG. 11 is an oblique view, viewed from the front, the right, and above, of the battery-cell unit 12 of the battery pack 202 according to Working Example 2.

As shown in FIG. 11, the battery-cell unit 12 comprises: the plurality of battery cells 18 (refer to FIG. 12); the cell holder 20, which is made of a resin (polymer) and holds the plurality of battery cells 18; and the control circuit board 22, which is held by the cell holder 20 upward of the cell holder 20. Battery-side terminals 23 are provided on the upper surface of the control circuit board 22.

Figure 12:
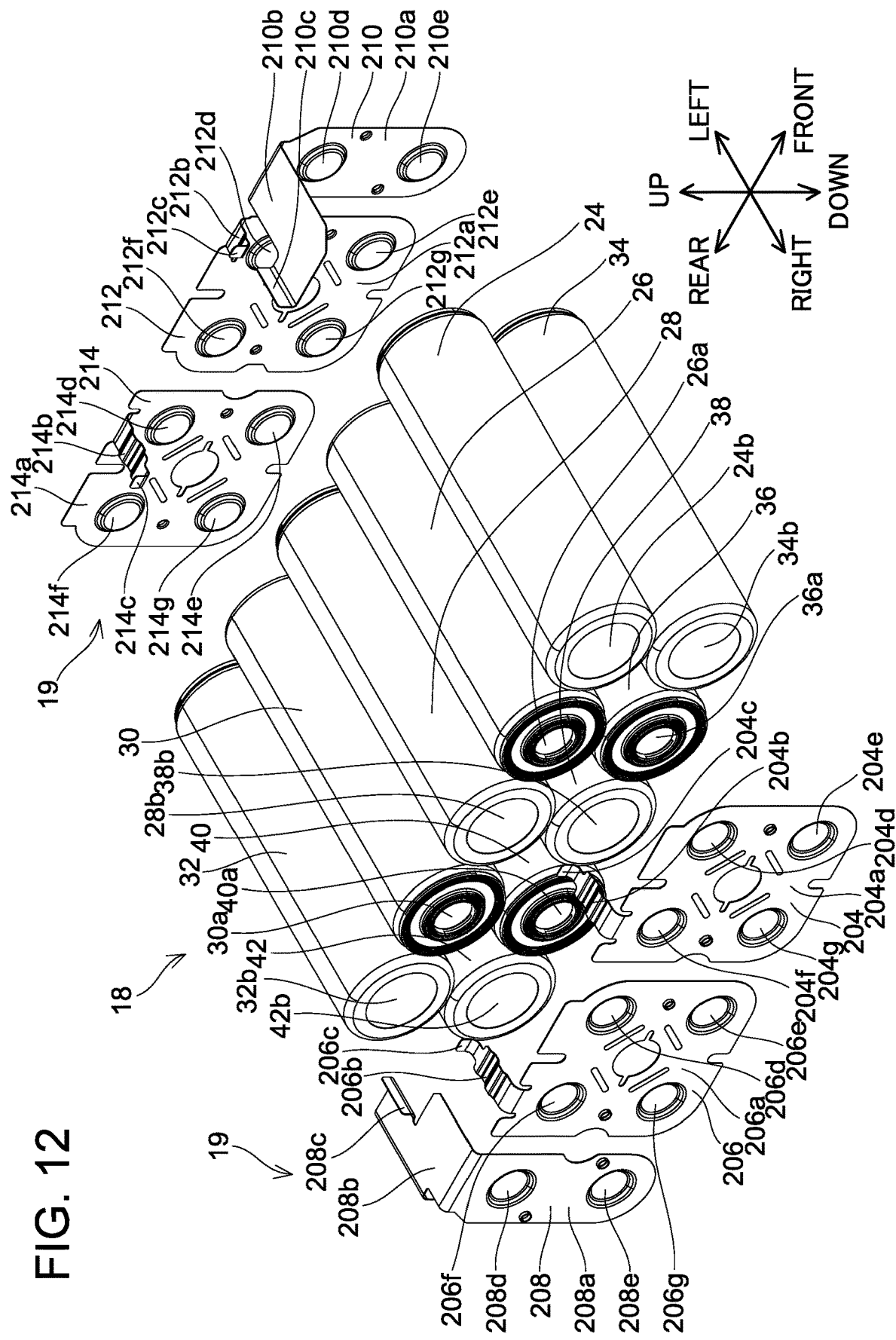
FIG. 12 is an oblique view, viewed from the front, the right, and above, that shows the correspondence relationship between a plurality of battery cells 18 and a plurality of battery tabs 19 of the battery pack 202 according to Working Example 2.

As shown in FIG. 12, the plurality of battery cells 18 comprises a total of 10 battery cells 24, 26, 28, 30, 32, 34, 36, 38, 40, 42, with two across (side-by-side) in the up-down direction and five across (side-by-side) in the front-rear direction. In the present Working Example 2, the battery cells 24, 28, 32, 34, 38 are held by the cell holder 20 such that the positive electrodes 24a, 28a, 32a, 34a, 38a, 42a are exposed at the left surface of the cell holder 20 and such that the negative electrodes 24b, 28b, 32b, 34b, 38b, 42b are exposed at the right surface of the cell holder 20. The battery cells 26, 30, 36, 40 are held by the cell holder 20 such that the positive electrodes 26a, 30a, 36a, 40a are exposed at the right surface of the cell holder 20 and such that the negative electrodes 26b, 30b, 36b, 40b are exposed at the left surface of the cell holder 20.

The battery tabs 19 are mounted on the plurality of battery cells 18. Each of the battery tabs 19 is a member (structure) that is made of a metal, i.e. a conductive material. The plurality of battery tabs 19 comprises: battery tabs 204, 206, 208, which are disposed on the right side of the cell holder 20; and battery tabs 210, 212, 214, which are disposed on the left side of the cell holder 20. The battery tab 204 comprises a sheet part 204a, a lead part 204b, a circuit-connection part 204c, and cell-connection parts 204d, 204e, 204f, 204g. The battery tab 206 comprises a sheet part 206a, a lead part 206b, a circuit-connection part 206c, and cell-connection parts 206d, 206e, 206f, 206g. The battery tab 208 comprises a sheet part 208a, a lead part 208b, a circuit-connection part 208c, and cell-connection parts 208d, 208e. The battery tab 210 comprises a sheet part 210a, a lead part 210b, a circuit-connection part 210c, and cell-connection parts 210d, 210e. The battery tab 212 comprises a sheet part 212a, a lead part 212b, a circuit-connection part 212c, and cell-connection parts 212d, 212e, 212f, 212g. The battery tab 214 comprises a sheet part 214a, a lead part 214b, a circuit-connection part 214c, and cell-connection parts 214d, 214e, 214f, 214g.

The cell-connection parts 204d, 204e, 204f, 204g of the battery tab 204, the cell-connection parts 206d, 206e, 206f, 206g of the battery tab 206, and the cell-connection parts 206d, 206e of the battery tab 206 are respectively spot-welded to the negative electrode 24b of the battery cell 24, the negative electrode 34b of the battery cell 34, the positive electrode 26a of the battery cell 26, the positive electrode 36a of the battery cell 36, the negative electrode 28b of the battery cell 28, the negative electrode 38b of the battery cell 38, the positive electrode 30a of the battery cell 30, the positive electrode 40a of the battery cell 40, the negative electrode 32b of the battery cell 32, and the negative electrode 42b of the battery cell 42.

The cell-connection parts 210d, 210e of the battery tab 210, the cell-connection parts 212d, 212e, 212f, 212g of the battery tab 212, and the cell-connection parts 214d, 214e, 214f, 214g of the battery tab 214 are respectively spot-welded to the positive electrode 24a of the battery cell 24, the positive electrode 34a of the battery cell 34, the negative electrode 26b of the battery cell 26, the negative electrode 36b of the battery cell 36, the positive electrode 28a of the battery cell 28, the positive electrode 38a of the battery cell 38, the negative electrode 30b of the battery cell 30, the negative electrode 40b of the battery cell 40, the positive electrode 32a of the battery cell 32, and the positive electrode 42a of the battery cell 42.

With regard to the plurality of battery cells 18 and the plurality of battery tabs 19 of the battery pack 202 according to the present Working Example 2, the battery cell 32 and the battery cell 42, which are electrically connected in parallel by the battery tab 208 and the battery tab 214, the battery cell 30 and the battery cell 40, which are electrically connected in parallel by the battery tab 214 and the battery tab 206, the battery cell 28 and the battery cell 38, which are electrically connected in parallel by the battery tab 206 and the battery tab 212, the battery cell 26 and the battery cell 36, which are electrically connected in parallel by the battery tab 212 and the battery tab 204, and the battery cell 24 and the battery cell 34, which are electrically connected in parallel by the battery tab 204 and the battery tab 210, are electrically connected in series.

As shown in FIG. 11, the circuit-connection part 208c of the battery tab 208 is inserted through a negative-electrode, power-supply opening 216, which is formed in the control circuit board 22, and is then electrically connected to a negative-electrode, power-supply terminal (not shown) of the control circuit board 22 using solder (not shown). The circuit-connection part 210c of the battery tab 210 is inserted through a positive-electrode, power-supply opening 218, which is formed in the control circuit board 22, and is then electrically connected to a positive-electrode, power-supply terminal (not shown) of the control circuit board 22 using solder (not shown). The circuit-connection parts 204c, 206c, 212c, 214c of the battery tabs 204, 206, 212, 214 are inserted through cell-voltage-detection openings 220, 222, 224, 226, which are formed in the control circuit board 22, and are then electrically connected to cell-voltage-detection terminals (not shown) of the control circuit board 22 using solder (not shown). It is noted that waterproof sheets 228, 230 are adhered to the battery tabs 206, 212, respectively. The waterproof sheet 228 is composed of, for example, a silicone rubber and reduces the likelihood of electrical shorts among (between) the battery tabs 204, 206, 208 caused by adhesion of moisture, electrically conductive foreign matter, etc. The waterproof sheet 230 is also composed of, for example, a silicone rubber and also reduces the likelihood of electrical shorts among (between) the battery tabs 210, 212, 214 caused by adhesion of moisture, electrically conductive foreign matter, etc.

Because the lead parts 204b, 206b, 212b, 214b and the circuit-connection parts 204c, 206c, 212c, 214c of the battery tabs 204, 206, 212, 214 are used to detect the cell voltages of the battery cells 18, the currents that flow therethrough are not so large. Consequently, even though the sheet thickness is small, the amount of heat generated does not become large, and consequently the temperature of the battery tabs 204, 206, 212, 214 does not become so high. In contrast, because the lead parts 208b, 210b and the circuit-connection parts 208c, 210c of the battery tabs 208, 210 are used for charging the plurality of battery cells 18 and for discharging the plurality of battery cells 18, large currents flow therethrough. Consequently, there is a risk that, if the sheet thickness of the battery tabs 208, 210 is small, then the amount of heat generated will become excessively large and the temperature of the battery tabs 208, 210 will become excessively high. Accordingly, in the battery pack 202 of the present Working Example 2, by making the sheet thickness of the battery tabs 208, 210 larger (thicker), the amount of heat generated in the lead parts 208b, 210b, the circuit-connection parts 208c, 210c, etc. is less likely to become excessively large, and thereby the temperature in the lead parts 208b, 210b, the circuit-connection parts 208c, 210c, etc. is less likely to become adversely excessively high, e.g., during a charging or discharging operation, in which large currents flow through the battery tabs 208, 210.

In the battery pack 202 of the present Working Example 2, each of the battery tabs 204, 206, 208, 210, 212, 214 is formed by punching (bending and cutting) separate sheet materials using a die. In the present Working Example 2, the battery tabs 208, 210 are formed by, for example, punching (i.e. bending and cutting) a sheet material whose sheet thickness is 0.2 mm using a die, and the battery tabs 204, 206, 212, 214 are formed by, for example, punching (i.e. bending and cutting) a sheet material whose sheet thickness is 0.15 mm using a die. By adopting such a configuration, the sheet thickness of the battery tabs 208, 210 can be made larger than the sheet thickness of the battery tabs 204, 206, 212, 214. Thereby, it is possible to reduce the amount of heat generated in the lead parts 208b, 210b, the circuit-connection parts 208c, 210c, etc. to avoid adversely excessively large temperature increases, and consequently to reduce the likelihood that the temperature of the lead parts 208b, 210b, the circuit-connection parts 208c, 210c, etc. will become adversely excessively high.

In addition, in the battery pack 202 of the present Working Example 2, heat tends to build up more in the battery cells 28, 38, which are disposed on the inner side (centrally), than in the battery cells 24, 26, 30, 32, 34, 36, 40, 42, which are disposed on the outer sides thereof, and consequently the temperature of the battery cells 28, 38 tends to become high. Consequently, for example, among the battery tabs 204, 206, 212, 214, the battery tabs 206, 212, which are mounted on the battery cells 28, 38, may be formed by, for example, punching a sheet material whose sheet thickness is 0.2 mm using a die, and the battery tabs 204, 214, which are mounted on the battery cells 28, 38, may be formed by, for example, punching a sheet material whose sheet thickness is 0.15 mm using a die. By adopting such a configuration, the amount of heat generated in the battery tabs 204, 214, which are mounted on the battery cells 28, 38, is reduced, and thereby the temperature of the battery tabs 204, 214 become less likely to reach an adversely excessively high during operation.

In one or more embodiments as described above, the battery pack 202 (one non-limiting example of a battery apparatus according to the present teachings) comprises: the plurality of battery cells 24, 26, 28, 30, 32, 34, 36, 38, 40, 42 respectively having the positive electrodes 24a, 26a, 28a, 30a, 32a, 34a, 36a, 38a, 40a, 42a and the negative electrodes 24b, 26b, 28b, 30b, 32b, 34b, 36b, 38b, 40b, 42b; and the plurality of battery tabs 204, 206, 208, 210, 212, 214 respectively having the cell-connection parts 204d, 204e, 204f, 204g, 206d, 206e, 206f, 206g, 208d, 208e, 210d, 210e, 212d, 212e, 212f, 212g, 214d, 214e, 214f, 214g (one non-limiting example of at least one cell-connection part according to the present teachings), which are electrically connected to the positive electrodes 24a, 26a, 28a, 30a, 32a, 34a, 36a, 38a, 40a, 42a or the negative electrodes 24b, 26b, 28b, 30b, 32b, 34b, 36b, 38b, 40b, 42b of respective ones of the battery cells 24, 26, 28, 30, 32, 34, 36, 38, 40, 42, and the sheet parts 204a, 206a, 208a, 210a, 212a, 214a, which are integrally formed with the cell-connection parts 204d, 204e, 204f, 204g, 206d, 206e, 206f, 206g, 208d, 208e, 210d, 210e, 212d, 212e, 212f, 212g, 214d, 214e, 214f, 214g. Each of the battery tabs 204, 206, 208, 210, 212, 214 is either (one of) the first-type battery tab or the second-type battery tab. The sheet thickness of at least one portion (e.g., the sheet parts 206a, 212a and the lead parts 208b, 210b) of the first-type battery tab (e.g., the battery tabs 206, 208, 210, 212) is larger than the sheet thickness of at least one portion (e.g., the sheet parts 204a, 214a and the lead parts 204b, 214b) of the second-type battery tab (e.g., the battery tabs 204, 214).

The location of each battery tab of the plurality of battery tabs 204, 206, 208, 210, 212, 214 undergoes a temperature increase owing to the generation of heat when electric current flows therethrough. If the sheet thickness at the location(s) where the electric current is flowing is small, electrical resistance is relatively high; therefore, the amount of heat generated is relatively larger and thereby the temperature of the battery tab may significantly rise in case a large current passes through it. Conversely, if the sheet thickness at the location(s) where the electric current is flowing is large, electrical resistance is lower; therefore, the amount of heat generated will be smaller (less) for the same current and thereby the temperature of the battery tab is less likely to rise. According to the above-described configuration, because the battery tabs (e.g., the battery tabs 206, 208, 210, 212) that are at locations (e.g., the sheet parts 206a, 212a and the lead parts 208b, 210b) where the temperature might otherwise increase excessively are configured as first-type battery tabs, the sheet thickness at those locations (e.g., the sheet parts 206a, 212a and the lead parts 208b, 210b) is made larger; therefore, less heat is generated at those locations (e.g., the sheet parts 206a, 212a and the lead parts 208b, 210b) (for the same amount of current) and thereby a rise in the temperature of such battery tabs can be curtailed. Consequently, this design reduces the possibility that any of the plurality of battery tabs 204, 206, 208, 210, 212, 214 will become excessively hot during usage of the battery pack 202.

In one or more embodiments, the electric current that flows through the at least one portion (e.g., the lead parts 208b, 210b) of the first-type battery tab (e.g., the battery tabs 208, 210) is larger than the electric current that flows through the at least one portion (e.g., the lead parts 204b, 214b) of the second-type battery tab (e.g., the battery tabs 204, 214).

From among the battery tabs of the plurality of battery tabs 204, 206, 208, 210, 212, 214, because the amount of heat generated at the location(s) (e.g., the lead parts 208b, 210b) where a large current flows is large, the temperature tends to rise; and because the amount of heat generated at the location(s) (e.g., the lead parts 204b, 214b) where the current that flows is not so large is small, the temperature tends not to rise. According to the above-described configuration, among the battery tabs 204, 206, 208, 210, 212, 214, by increasing the sheet thickness at the location(s) (e.g., the lead parts 208b, 210b) where a large current flows, the amount of heat generated can be reduced and thereby a rise in temperature of the battery tabs can be curtailed. Consequently, it is possible to reduce heat generating in battery tabs that might otherwise reach an excessively high temperature during operation of the battery pack 202.

In one or more embodiments, the battery pack 202 further comprises the control circuit board 22 (example of circuit board). The plurality of battery tabs 204, 206, 208, 210, 212, 214 further comprises the circuit-connection parts 204c, 206c, 208c, 210c, 212c, 214c, which are electrically connected to the control circuit board 22, and the lead parts 204b, 206b, 208b, 210b, 212b, 214b, which are integrally formed with the circuit-connection parts 204c, 206c, 208c, 210c, 212c, 214c and with the sheet parts 204a, 206a, 208a, 210a, 212a, 214a. The at least one portion of the first-type battery tab (e.g., the battery tabs 208, 210) includes the lead part (e.g., the lead parts 208b, 210b) of the first-type battery tab (e.g., the battery tabs 208, 210). The at least one (thicker) portion of the second-type battery tab (e.g., the battery tabs 204, 214) includes the lead part (e.g., the lead parts 204b, 214b) of the second-type battery tab (e.g., the battery tabs 204, 214).

When the circuit-connection parts 204c, 206c, 208c, 210c, 212c, 214c of the plurality of battery tabs 204, 206, 208, 210, 212, 214 are electrically connected to the control circuit board 22, some of the plurality of battery tabs 204, 206, 208, 210, 212, 214 conduct a relatively large current to some of the lead parts 204b, 206b, 208b, 210b, 212b, 214b and some conduct a much smaller current to others of the lead parts 204b, 206b, 208b, 210b, 212b, 214b. According to the above-described configuration, by using the first-type battery tabs (e.g., the battery tabs 208, 210) to conduct large currents through the lead parts (e.g., the lead parts 208b, 210b), the sheet thickness of those lead parts (e.g., the lead parts 208b, 210b) can be made larger; therefore, the amount of heat generated in those lead parts (e.g., the lead parts 208b, 210b) can be reduced and thereby a rise in temperature of those battery tabs can be curtailed. Consequently, such high-current-conducting battery tabs are less likely to reach an excessively high temperature during operation.

In one or more embodiments, the at least one (thicker) portion of the first-type battery tab (e.g., the battery tabs 208, 210) includes the circuit-connection part (e.g., the circuit-connection parts 208c, 210c) of the first-type battery tab (e.g., the battery tabs 208, 210). The at least one portion of the second-type battery tab (e.g., the battery tabs 204, 214) includes the circuit-connection part (e.g., the circuit-connection parts 204c, 214c) of the second-type battery tab (e.g., the battery tabs 204, 214).

When the circuit-connection parts 204c, 206c, 208c, 210c, 212c, 214c of the plurality of battery tabs 204, 206, 208, 210, 212, 214 are electrically connected to the control circuit board 22, some of battery tabs 204, 206, 208, 210, 212, 214 conduct a relatively large current to the circuit-connection parts 204c, 206c, 208c, 210c, 212c, 214c and some do not. According to the above-described configuration, by using the first-type battery tabs (e.g., the battery tabs 208, 210) to conduct large currents to the circuit-connection parts (e.g., the circuit-connection parts 208c, 210c), the sheet thickness of those circuit-connection parts (e.g., the circuit-connection parts 208c, 210c) can be made larger; therefore, the amount of heat generated in those circuit-connection parts (e.g., the circuit-connection parts 208c, 210c) can be reduced and thereby a temperature rise can be curtailed. Consequently, such battery tabs become less likely to reach an excessively high temperature.

In one or more embodiments, the width of the circuit-connection part (e.g., the circuit-connection parts 208c, 210c) of the first-type battery tab (e.g., the battery tabs 208, 210) is smaller than the width of the lead part (e.g., the lead parts 208b, 210b) of the first-type battery tab (e.g., the battery tabs 208, 210).

With regard to each of the battery tabs (e.g., the battery tabs 208, 210), if the width of the circuit-connection part (e.g., the circuit-connection parts 208c, 210c) is smaller than the width of the lead part (e.g., the lead parts 208b, 210b), the electrical resistance of the circuit-connection part (e.g., the circuit-connection parts 208c, 210c) is larger; therefore, the amount of heat generated is larger (for the same current) and thereby the temperature tends to rise. According to the above-described configuration, by configuring the battery tabs (e.g., the battery tabs 208, 210) in which the electrical resistance of the circuit-connection parts (e.g., the circuit-connection parts 208c, 210c) would otherwise be larger as the first-type battery tabs, the sheet thickness of those circuit-connection parts (e.g., the circuit-connection parts 208c, 210c) can be made larger; therefore, the amount of heat generated at the circuit-connection parts (e.g., the circuit-connection parts 208c, 210c) can be reduced and thereby a rise in temperature can be curtailed. Consequently, such battery tabs become less likely to reach an excessively high temperature.

In one or more embodiments, the width of the circuit-connection part (e.g., the circuit-connection parts 208c, 210c) of the first-type battery tab (e.g., the battery tabs 208, 210) is smaller than the width of the sheet part (e.g., the sheet parts 208a, 210a) of the first-type battery tab (e.g., the battery tabs 208, 210).

With regard to each of the battery tabs (e.g., the battery tabs 208, 210), if the width of the circuit-connection part (e.g., the circuit-connection parts 208c, 210c) is smaller than the width of the sheet part (e.g., the sheet parts 208a, 210a), the electrical resistance of the circuit-connection part (e.g., the circuit-connection parts 208c, 210c) is larger; therefore, the amount of heat generated is larger (for the same current) and thereby the temperature may tend to rise during operation. According to the above-described configuration, by configuring the battery tabs (e.g., the battery tabs 208, 210) in which the electrical resistance of the circuit-connection parts (e.g., the circuit-connection parts 208c, 210c) would otherwise be large as the first-type battery tabs, the sheet thickness of those circuit-connection parts (e.g., the circuit-connection parts 208c, 210c) can be made larger; therefore, the amount of heat generated at those circuit-connection parts (e.g., the circuit-connection parts 208c, 210c) can be reduced and thereby a rise in temperature can be curtailed. Consequently, such battery tabs become less likely to reach an excessively high temperature.

In one or more embodiments, the control circuit board 22 comprises: a positive-electrode, power-supply terminal and a negative-electrode, power-supply terminal, which are for charging the plurality of battery cells 24, 26, 28, 30, 32, 34, 36, 38, 40, 42 and for discharging the plurality of battery cells 24, 26, 28, 30, 32, 34, 36, 38, 40, 42; and cell-voltage-detection terminals, which are for detecting the cell voltages of the battery cells of the plurality of battery cells 24, 26, 28, 30, 32, 34, 36, 38, 40, 42. Each of the circuit-connection parts (e.g., the circuit-connection parts 208c, 210c) of the first-type battery tabs (e.g., the battery tabs 208, 210) is electrically connected to the positive-electrode, power-supply terminal or the negative-electrode, power-supply terminal. The circuit-connection parts (e.g., the circuit-connection parts 204c, 214c) of the second-type battery tabs (e.g., the battery tabs 204, 214) are electrically connected to the cell-voltage-detection terminals.

In the above-described configuration, because the electric currents that flow to the lead parts (e.g., the lead parts 208b, 210b), the circuit-connection parts (e.g., the circuit-connection parts 208c, 210c), and the like of the first-type battery tabs (e.g., the battery tabs 208, 210) are for charging and discharging the plurality of battery cells 24, 26, 28, 30, 32, 34, 36, 38, 40, 42, those currents are relatively large. In contrast, because the currents that flow to the lead parts (e.g., the lead parts 204b, 214b), the circuit-connection parts (e.g., the circuit-connection parts 204c, 214c), and the like of the second-type battery tabs (e.g., the battery tabs 204, 214) are for detecting the cell voltages of the plurality of battery cells 24, 26, 28, 30, 32, 34, 36, 38, 40, 42, those currents are not so large. According to the above-described configuration, the battery tabs (e.g., the battery tabs 208, 210) among the plurality of battery tabs 204, 206, 208, 210, 212, 214 through which large currents flow to the lead parts (e.g., the lead parts 208b, 210b), the circuit-connection parts (e.g., the circuit-connection parts 208c, 210c), and the like are configured as the first-type battery tabs and thereby the sheet thickness of those lead parts (e.g., the lead parts 208b, 210b), circuit-connection parts (e.g., the circuit-connection parts 208c, 210c), and the like is made larger; therefore, the amount of heat generated in those lead parts (e.g., the lead parts 208b, 210b), circuit-connection parts (e.g., the circuit-connection parts 208c, 210c), and the like can be reduced and thereby a rise in temperature can be curtailed. Consequently, such battery tabs become less likely to reach an excessively high temperature.

In one or more embodiments, the plurality of battery cells 24, 26, 28, 30, 32, 34, 36, 38, 40, 42 includes the battery cells 24, 34 (or the battery cells 32, 42) (one non-limiting example of a first battery cell according to the present teachings). The battery tab 210 (or the battery tab 208) electrically connected to the positive electrodes 24a, 34a of the battery cells 24, 34 (or the negative electrodes 32b, 42b of the battery cells 32, 42) is configured as the first-type battery tab. The battery tab 204 (or the battery tab 214) electrically connected to the negative electrodes 24b, 34b of the battery cells 24, 34 (or the positive electrodes 32a, 42a of the battery cells 32, 42) is configured as the second-type battery tab.

The temperature of the battery tab 210 (or the battery tab 208), among the battery tabs 204, 210 (or the battery tabs 208, 214) electrically connected to the battery cells 24, 34 (or the battery cells 32, 42), electrically connected to the positive electrodes 24a, 34a (or the negative electrodes 32b, 42b) tends to become high, and the temperature of the battery tab 204 (or the battery tab 214) electrically connected to the negative electrodes 24b, 34b (or the positive electrodes 32a, 42a) tends not to become high. According to the above-described configuration, the battery tab 210 (or the battery tab 208), among the battery tabs 204, 210 (or the battery tabs 208, 214) electrically connected to the battery cells 24, 34 (or the battery cells 32, 42), whose temperature tends to become high are configured as the first-type battery tabs and thereby their sheet thickness is made larger; therefore, the amount of heat generated can be reduced, and a rise in temperature can be curtailed. Consequently, such battery tabs become less likely to reach an excessively high temperature.

In one or more embodiments, the plurality of battery cells 24, 26, 28, 30, 32, 34, 36, 38, 40, 42 comprises the battery cells 28, 38 (one non-limiting example of a first battery cell according to the present teachings), which are disposed in the vicinity of the center of the plurality of battery cells 24, 26, 28, 30, 32, 34, 36, 38, 40, 42, and the battery cells 26, 36 (or the battery cells 30, 40) (one non-limiting example of a second battery cell according to the present teachings), which are disposed on the outer sides of the battery cells 28, 38. The battery tab 206 (or the battery tab 212) electrically connected to the negative electrodes 28b, 38b (or the positive electrodes 28a, 38a) of the battery cells 28, 38 is configured as the first-type battery tab. The battery tab 204 (or the battery tab 214) electrically connected to the positive electrodes 26a, 36a of the battery cells 26, 36 (or the negative electrodes 30b, 40b of the battery cells 30, 40) is configured as the second-type battery tab.

Generally speaking, among the plurality of battery cells 24, 26, 28, 30, 32, 34, 36, 38, 40, 42, those that are disposed in the vicinity of the center (e.g., the battery cells 28, 38) tend to heat up more than battery cells on the outer side; consequently, the temperature of the battery tabs (e.g., the battery tabs 206, 212) electrically connected to those battery cells tends to become high. In contrast, with regard to the battery cells (e.g., the battery cells 26, 36, 30, 40) disposed on the outer sides, heat tends not to build up because ventilation is better for the outer battery cells, and the temperature of the battery tabs (e.g., the battery tabs 204, 214) electrically connected to those battery cells tends not to become high. According to the above-described configuration, the battery tabs (e.g., the battery tabs 206, 212) in which the temperature tends to become high are configured as the first-type battery tabs and thereby their sheet thickness is made larger; therefore, the amount of heat generated in those battery tabs can be reduced, and a rise in temperature can be curtailed. Consequently, the possibility can be reduced that any of the battery tabs 204, 206, 208, 210, 212, 214 will reach an excessively high temperature during operation of the battery pack 202.

Modified Examples

The above-described working examples were explained using the battery packs 2, 202 as exemplary embodiments of the battery apparatus of the present teachings; however, the battery apparatus according to the present teachings includes or encompasses other types of battery apparatus, for example, an attachable battery apparatus (portable backpack power supply) in which, for example, shoulder belts, a hip belt, and the like are attached to the battery apparatus so that the user can carry the battery apparatus on his or her back. In such an embodiment, the battery apparatus and the electrical equipment may be electrically connected by, for example, a connection cord (power cord).

In the above-described embodiments, the battery cell(s) 18 is (are) not limited to having a substantially circular-column shape and may be a so-called rectangular-prism type or may be a laminate type.

A battery apparatus according to the present teachings may contain a number and type of battery cells such that the battery apparatus as a whole as a nominal output voltage of at least 12 volts, more preferably at least 18 volts, or at least 36 volts. The upper limit of the nominal output voltage is not particularly limited, but may be, e.g., 60 volts, or 50 volts, or 40 volts. In addition or in the alternative, a battery apparatus according to the present teachings may contain a number and type of battery cells such that the battery pack 2, 202 as a whole as a nominal output capacity of at least 2.0 amp hours, more preferably at least 3 amp hours, e.g., at least 4 amp hours. The upper limit of the nominal output capacity is not particularly limited, but may be, e.g., 20 amp hours, or 15 amp hours or 10 amp hours.

EXPLANATION OF THE REFERENCE NUMBERS

2 Battery pack
10 Casing
12 Battery-cell unit
14 Lower casing
16 Upper casing
18 Plurality of battery cells
19 Plurality of battery tabs
20 Cell holder
22 Control circuit board
23 Battery-side terminal
24 Battery cell
24a Positive electrode
24b Negative electrode
26 Battery cell
26a Positive electrode
26b Negative electrode
28 Battery cell
28a Positive electrode
28b Negative electrode
30 Battery cell
30a Positive electrode
30b Negative electrode
32 Battery cell
32a Positive electrode
32b Negative electrode
34 Battery cell
34a Positive electrode
34b Negative electrode
36 Battery cell
36a Positive electrode
36b Negative electrode
38 Battery cell
38a Positive electrode
38b Negative electrode
40 Battery cell
40a Positive electrode
40b Negative electrode
42 Battery cell
42a Positive electrode
42b Negative electrode
44 Battery tab
44a Sheet part
44b Lead part
44c Circuit-connection part
44d Cell-connection part
46 Battery tab
46a Sheet part
46b Lead part
46c Circuit-connection part
46d Cell-connection part
46e Cell-connection part
48 Battery tab
48a Sheet part
48b Lead part
48c Circuit-connection part
48d Cell-connection part
48e Cell-connection part
50 Battery tab 50a Sheet part
50b Lead part
50c Circuit-connection part
50d Cell-connection part
50e Cell-connection part
52 Battery tab
52a Sheet part
52b Lead part
52c Circuit-connection part
52d Cell-connection part
52e Cell-connection part
54 Battery tab
54a Sheet part
54b Lead part
54c Circuit-connection part
54d Cell-connection part
56 Battery tab
56a Sheet part
56b Lead part
56c Circuit-connection part
56d Cell-connection part
56e Cell-connection part
58 Battery tab
58a Sheet part
58b Lead part
58c Circuit-connection part
58d Cell-connection part
58e Cell-connection part
60 Battery tab
60a Sheet part
60b Lead part
60c Circuit-connection part
60d Cell-connection part
60e Cell-connection part
62 Battery tab
62a Sheet part
62b Lead part
62c Circuit-connection part
62d Cell-connection part
62e Cell-connection part
64 Battery tab
64a Sheet part
64b Lead part
64c Circuit-connection part
64d Cell-connection part
64e Cell-connection part
66 Negative-electrode, power-supply opening
66a Solder
68 Positive-electrode, power-supply opening
68a Solder
70 Cell-voltage-detection opening
70a Solder
72 Cell-voltage-detection opening
72a Solder
74 Cell-voltage-detection opening
74a Solder
76 Cell-voltage-detection opening
76a Solder
78 Cell-voltage-detection opening
78a Solder
80 Cell-voltage-detection opening
80a Solder
82 Cell-voltage-detection opening
82a Solder
84 Cell-voltage-detection opening
84a Solder
86 Cell-voltage-detection opening 86a Solder
88 Film
90 Film
92 Waterproof sheet
94 Film
96 Film
98 Waterproof sheet
100 Sheet material
102 Sheet material
104 First sheet material
104a Sheet part
104b Lead part
104c Circuit-connection part
104d Cell-connection part
106 First sheet material
106a Sheet part
106b Lead part
106c Circuit-connection part
106d Cell-connection part
106e Cell-connection part
108 First sheet material
108a Sheet part
108b Lead part
108c Circuit-connection part
108d Cell-connection part
108e Cell-connection part
110 First sheet material
110a Sheet part
110b Lead part
110c Circuit-connection part
110d Cell-connection part
110e Cell-connection part
112 First sheet material
112a Sheet part
112b Lead part
112c Circuit-connection part
112d Cell-connection part
112e Cell-connection part
114 First sheet material
114a Sheet part
114b Lead part
114c Circuit-connection part
114d Cell-connection part
124 Second sheet material
124a Sheet part
124b Lead part
124c Circuit-connection part
126 Second sheet material
126a Sheet part
128 Second sheet material
128a Sheet part
130 Second sheet material
130a Sheet part
132 Second sheet material
132a Sheet part
134 Second sheet material
134a Sheet part
134b Lead part
134c Circuit-connection part
202 Battery pack
204 Battery tab
204a Sheet part
204b Lead part
204c Circuit-connection part
204d Cell-connection part
204e Cell-connection part
204f Cell-connection part 204g Cell-connection part
206 Battery tab
206a Sheet part
206b Lead part
206c Circuit-connection part
206d Cell-connection part
206e Cell-connection part
206f Cell-connection part
206g Cell-connection part
208 Battery tab
208a Sheet part
208b Lead part
208c Circuit-connection part
208d Cell-connection part
208e Cell-connection part
210 Battery tab
210a Sheet part
210b Lead part
210c Circuit-connection part
210d Cell-connection part
210e Cell-connection part
212 Battery tab
212a Sheet part
212b Lead part
212c Circuit-connection part
212d Cell-connection part
212e Cell-connection part
212f Cell-connection part
212g Cell-connection part
214 Battery tab
214a Sheet part
214b Lead part
214c Circuit-connection part
214d Cell-connection part
214e Cell-connection part
214f Cell-connection part
214g Cell-connection part
216 Negative-electrode, power-supply opening
218 Positive-electrode, power-supply opening
220 Cell-voltage-detection opening
222 Cell-voltage-detection opening
224 Cell-voltage-detection opening
226 Cell-voltage-detection opening
228 Waterproof sheet
230 Waterproof sheet

The invention claimed is:

1. A battery apparatus comprising:
a plurality of battery cells, each of the battery cells having a positive electrode and a negative electrode;
a circuit board comprising a positive-electrode, power-supply terminal and a negative-electrode, power-supply terminal, which are configured to conduct electric current for charging and discharging the plurality of battery cells; and cell-voltage-detection terminals, which are configured to conduct electric current for detecting cell voltages of the battery cells;
a plurality of battery tabs, each of the battery tabs having at least one cell-connection part, which is electrically connected to the positive electrode or the negative electrode of a respective one of the battery cells, a sheet part, which is integrally formed with the at least one cell-connection part, a circuit-connection part, which is electrically connected to the circuit board, and a lead part, which is integrally formed with the circuit-connection part and with the sheet part such that the lead part is disposed between, and connects, the circuit-connection part and the sheet part;

wherein:
each of the battery tabs is either a first battery tab or a second battery tab;
at least the lead part of the first battery tab has a sheet thickness that is larger than the sheet thickness of at least the lead part of the second battery tab;
each of the circuit-connection parts of the first battery tabs is electrically connected to the positive-electrode, power-supply terminal or the negative-electrode, power-supply terminal; and
the circuit-connection parts of the second battery tabs are electrically connected to the cell-voltage-detection terminals.

2. The battery apparatus according to claim 1, wherein the battery apparatus is configured such that an electric current that flows through the at least the lead part of the first battery tab is larger than a maximum electric current that flows through the at least the lead part of the second battery tab.

3. The battery apparatus according to claim 1, wherein:
the circuit-connection part of the first battery tab also has a sheet thickness that is larger than the sheet thickness of the circuit-connection part of the second battery tab.

4. The battery apparatus according to claim 3, wherein the circuit-connection part of the first battery tab has a width that is smaller than the width of the lead part of the first battery tab.

5. The battery apparatus according to claim 3, wherein the circuit-connection part of the first battery tab has a width that is smaller than the width of the sheet part of the first battery tab.

6. The battery apparatus according to claim 2, wherein:
the circuit-connection part of the first battery tab also has a sheet thickness that is larger than the sheet thickness of the circuit-connection part of the second battery tab.

7. The battery apparatus according to claim 6, wherein the circuit-connection part of the first battery tab has a width that is smaller than the width of the lead part of the first battery tab and/or than the width of the sheet part of the first battery tab.

8. The battery apparatus according to claim 7, wherein:
the circuit board comprises: a positive-electrode, power-supply terminal and a negative-electrode, power-supply terminal, which are configured to conduct electric current for charging and discharging the plurality of battery cells; and cell-voltage-detection terminals, which are configured to conduct electric current for detecting cell voltages of the battery cells;
each of the circuit-connection parts of the first battery tabs is electrically connected to the positive-electrode, power-supply terminal or the negative-electrode, power-supply terminal;
the circuit-connection parts of the second battery tabs are electrically connected to the cell-voltage-detection terminals;
the plurality of battery cells includes first battery cells;
the first battery tabs are electrically connected to one of the positive electrode or the negative electrode of the first battery cells;
the second battery tabs are electrically connected to the other of the positive electrode and the negative electrode of the first battery cells;
each of the battery cells has a substantially circular-column shape extending along a longitudinal direction, the positive electrode is disposed at one end portion in the longitudinal direction, the negative electrode is disposed at the other end portion in the longitudinal direction, and the battery cells are arranged side-byside such that the longitudinal directions of the battery cells extend side-by-side in a first direction;

on one side in the first direction, the first battery tabs are electrically connected to the positive electrodes or the negative electrodes of the plurality of battery cells; and on the other side in the first direction, the second battery tabs are electrically connected to the positive electrodes or the negative electrodes of the plurality of battery cells.

9. The battery apparatus according to claim 8, wherein:
the first battery tabs are composed of a single sheet material;
the second battery tabs are composed of a single sheet material; and
an overall sheet thickness of the first battery tabs is greater than an overall sheet thickness of the second battery tabs.

10. The battery apparatus according to claim 1, wherein:
the plurality of battery cells includes first battery cells;
the first battery tabs are electrically connected to one of the positive electrode or the negative electrode of the first battery cells; and
the second battery tabs are electrically connected to the other of the positive electrode and the negative electrode of the first battery cells.

11. The battery apparatus according to claim 1, wherein:
each of the battery cells has a substantially circular-column shape extending along a longitudinal direction, the positive electrode is disposed at one end portion in the longitudinal direction, the negative electrode is disposed at the other end portion in the longitudinal direction, and the battery cells are arranged side-by-side such that the longitudinal directions of the battery cells extend side-by-side in a first direction;
on one side in the first direction, the first battery tabs are electrically connected to the positive electrodes or the negative electrodes of the plurality of battery cells; and
on the other side in the first direction, the second battery tabs are electrically connected to the positive electrodes or the negative electrodes of the plurality of battery cells.

12. The battery apparatus according to claim 1, wherein:
the plurality of battery cells comprises first battery cells, which are disposed in the vicinity of the center of the plurality of battery cells, and second battery cells, which are disposed on an outer side of the first battery cells;
the first battery tabs are electrically connected to the positive electrodes or the negative electrodes of the first battery cells; and
the second battery tabs are electrically connected to the positive electrodes or the negative electrodes of the second battery cells.

13. The battery apparatus according to claim 1, wherein:
the first battery tabs are composed of a single sheet material;
the second battery tabs are composed of a single sheet material; and
an overall sheet thickness of the first battery tabs is greater than an overall sheet thickness of the second battery tabs.

14. The battery apparatus according to claim 1, wherein each of the first battery tabs is composed of a first sheet material overlaid on a second sheet material.

15. The battery apparatus according to claim 14, wherein:
the first sheet material has at least one first cell-connection part corresponding to the at least one cell-connection part; and
the second sheet material does not have a portion corresponding to the at least one cell-connection part.

16. The battery apparatus according to claim 1, wherein:
each of the first battery tabs comprises a first sheet material overlaid on a second sheet material;
the first sheet material comprises a first circuit-connection part corresponding to the circuit-connection part;
the second sheet material comprises a second circuit-connection part corresponding to the circuit-connection part; and
the first circuit-connection part and the second circuit-connection part are joined to the circuit board by common solder.

17. The battery apparatus according to claim 16, wherein the first circuit-connection part and the second circuit-connection part are inserted through a common through hole, which is formed in the circuit board.

18. The battery apparatus according to claim 1, wherein:
the first battery tabs are composed of a first sheet material overlaid on a second sheet material;
the first sheet material comprises a first circuit-connection part corresponding to the circuit-connection part; and
the second sheet material does not have a portion corresponding to the circuit-connection part.

19. The battery apparatus according to claim 1, wherein each of the battery tabs is a discrete member that is spaced apart from each of the other battery tabs such that there is a gap between adjacent ones of the battery tabs.

* * * * *